(12) United States Patent
Fujimaki et al.

(10) Patent No.: US 8,370,108 B2
(45) Date of Patent: Feb. 5, 2013

(54) DIAGNOSTIC DEVICE

(75) Inventors: Ryohei Fujimaki, Tokyo (JP); Takayuki Nakata, Tokyo (JP); Akinori Satou, Tokyo (JP); Hidenori Tsukahara, Tokyo (JP)

(73) Assignee: NEC Corporation, Tokyo (JP)

( * ) Notice: Subject to any disclaimer, the term of this patent is extended or adjusted under 35 U.S.C. 154(b) by 514 days.

(21) Appl. No.: 12/532,455

(22) PCT Filed: Mar. 21, 2008

(86) PCT No.: PCT/JP2008/055250
§ 371 (c)(1),
(2), (4) Date: Sep. 22, 2009

(87) PCT Pub. No.: WO2008/114863

PCT Pub. Date: Sep. 25, 2008

(65) Prior Publication Data
US 2010/0131800 A1    May 27, 2010

(30) Foreign Application Priority Data

Mar. 22, 2007  (JP) .................................. 2007-074011

(51) Int. Cl.
*G06F 11/30*  (2006.01)
(52) U.S. Cl. ........................ 702/182; 714/37; 714/47.1
(58) Field of Classification Search ................ 702/35, 702/182–185, 188; 714/25, 37, 47.1, 47.3
See application file for complete search history.

(56) References Cited

U.S. PATENT DOCUMENTS

| 6,999,898 B2 * | 2/2006 | King et al. ..................... 702/183 |
| 7,379,846 B1 * | 5/2008 | Williams et al. .............. 702/185 |
| 2005/0209820 A1 | 9/2005 | Inoue et al. |

FOREIGN PATENT DOCUMENTS

| JP | 03-206526 | 9/1991 |
| JP | 10-20925 | 1/1998 |
| JP | 2002-99319 | 4/2002 |
| JP | 2002-155708 | 5/2002 |

(Continued)

OTHER PUBLICATIONS

Chinese Office Action issued on Jan. 20, 2011 with English and Japanese Translation for Chinese Patent Application No. 200880009435.5.

(Continued)

*Primary Examiner* — Manuel L Barbee
(74) *Attorney, Agent, or Firm* — Young & Thompson

(57) ABSTRACT

A diagnostic device detects a fault and estimates its cause based on the degree of change of measured data attributes. A diagnostic object change degree pattern (CDP) generation unit calculates the degree of change of each attribute of data, including attributes of the object being diagnosed measured from the object being diagnosed to generate a diagnostic object CDP which is a combination of values of the degree of change of the respective attributes. A criterion CDP memory holds in store a criterion CDP, formed of a pattern of values of the degree of change of the attributes of data measured from the object being diagnosed, in association with event(s)-to-be-diagnosed on the fault sort basis or on the fault cause basis. A CDP diagnosis unit effects pattern matching between the diagnostic object CDP and the criterion CDP in the criterion CDP memory to diagnose the object being diagnosed.

26 Claims, 29 Drawing Sheets

FOREIGN PATENT DOCUMENTS

| | | |
|---|---|---|
| JP | 2003-44123 | 2/2003 |
| JP | 2005-257416 | 9/2005 |
| JP | 2005-345154 | 12/2005 |
| JP | 2007-18530 | 1/2007 |

OTHER PUBLICATIONS

International Search Report—PCT/JP2008/055250—May 1, 2008.

Markus M. Breunig et al.—LOF: Identifying Density-Based Local Outliers—Proc. ACM SIGMOD 2000 Int. Conf. On Management of Data, Dallas, Tx, 2000—pp. 1-12 , Jun. 2000.

Jun-Ichi Takeuchi et al.—A Unifying Framework for Detecting Outliers and Change Points from Time Series—internet systems Research Laboratories, NEC Corporation—Jul. 2003.

Uri N. Lerner—Hybrid Bayesian Networks for Reasoning about Complex Systems—Oct. 2002.

Du R et al: "Automated Monitoring of Manufacturing Processes, Part 1: Monitoring Methods", Transactions of the American Society of Mechanical Engineers, Series B: Journal of Engineering for Industry, ASME. New York, US, vol. 117, No. 2, May 1, 1995, pp. 121-132, XP000521507, issn: 0022-0817.

Luis A M Riascos et al.: "Bayesian Newtwork Supervision on Fault Tolerant Fuel Cells", The 2006 IEEE Industry Applications Conference Forty-First IAS Annual Meeting, Conference Record of, IEEE, Piscataway, NJ, US, Oct. 1, 2006 , pp. 1059-1066, XP031026158, ISBN: 978-1-4244-0364-6 *p. 1065*.

Supplementary European Search Report—EP 08 72 2614—Oct. 25, 2012.

European Official Action—08 722 614.8-2206—Nov. 20, 2012.

\* cited by examiner

FIG. 2

| PATTERN NUMBERS | EVENTS | CRITERION CHANGE DEGREE PATTERNS |
|---|---|---|
| 1 | FAULT A | $y_1^1, y_1^2, \ldots, y_1^m$ |
| 2 | FAULT B | $y_2^1, y_2^2, \ldots, y_2^m$ |
| 3 | FAULT C | $y_3^1, y_3^2, \ldots, y_3^m$ |

FIG. 4

| PATTERN NUMBERS | EVENTS | CRITERION CHANGE DEGREE PATTERNS |
|---|---|---|
| 11 | FAULT A DUE TO CAUSE a1 | $y_{11}^1, y_{11}^2, \ldots, y_{11}^m$ |
| 12 | FAULT A DUE TO CAUSE a2 | $y_{12}^1, y_{12}^2, \ldots, y_{12}^m$ |
| 13 | FAULT B DUE TO CAUSE b1 | $y_{13}^1, y_{13}^2, \ldots, y_{13}^m$ |
| 14 | FAULT B DUE TO CAUSE b2 | $y_{14}^1, y_{14}^2, \ldots, y_{14}^m$ |
| 15 | FAULT C DUE TO CAUSE c1 | $y_{15}^1, y_{15}^2, \ldots, y_{15}^m$ |
| 16 | FAULT C DUE TO CAUSE c2 | $y_{16}^1, y_{16}^2, \ldots, y_{16}^m$ |
| 17 | FAULT C DUE TO CAUSE c3 | $y_{17}^1, y_{17}^2, \ldots, y_{17}^m$ |

FIG. 5

| PATTERN NUMBERS | EVENTS | CRITERION CHANGE DEGREE PATTERNS |
|---|---|---|
| 1 | FAULT A | $y_1^1, y_1^2, \ldots, y_1^m$ |
| 2 | FAULT B | $y_2^1, y_2^2, \ldots, y_2^m$ |
| 3 | FAULT C | $y_3^1, y_3^2, \ldots, y_3^m$ |
| 21 | NORMAL | $x_1^1, x_1^2, \ldots, x_1^m$ |
| 22 | NORMAL | $x_2^1, x_2^2, \ldots, x_2^m$ |
| ... | ... | ... |
| 2n | NORMAL | $x_n^1, x_n^2, \ldots, x_n^m$ |

FIG. 8

| EVENTS | CARDINALITY DEGREE | | | |
|---|---|---|---|---|
| | ATTRIBUTE 1 | ATTRIBUTE 2 | ... | ATTRIBUTE m |
| EVENT 1 | $w_{11}$ | $w_{12}$ | ... | $w_{1m}$ |
| EVENT 2 | $w_{21}$ | $w_{22}$ | ... | $w_{2m}$ |
| ... | ... | ... | ... | ... |
| EVENT n | $w_{n1}$ | $w_{n2}$ | ... | $w_{nm}$ |

FIG. 10

DATA OF LAYERED STRUCTURE

| FIRST LAYER | FAULT A(1) | | FAULT B(2) | | FAULT C(2) | | |
|---|---|---|---|---|---|---|---|
| SECOND LAYER | CAUSE a1 (11) | CAUSE a2 (12) | CAUSE b1 (13) | CAUSE b2 (14) | CAUSE c1 (15) | CAUSE c2 (16) | CAUSE c3 (17) |

FIRST LAYER PATTERN SET

| PATTERN NUMBERS | EVENTS | CRITERION CHANGE DEGREE PATTERNS |
|---|---|---|
| 1 | FAULT A | $y_1^1, y_1^2, \ldots, y_1^m$ |
| 2 | FAULT B | $y_2^1, y_2^2, \ldots, y_2^m$ |
| 3 | FAULT C | $y_3^1, y_3^2, \ldots, y_3^m$ |

SECOND LAYER PATTERN SET

| PATTERN NUMBERS | EVENTS | CRITERION CHANGE DEGREE PATTERNS |
|---|---|---|
| 11 | FAULT A DUE TO CAUSE a1 | $y_{11}^1, y_{11}^2, \ldots, y_{11}^m$ |
| 12 | FAULT A DUE TO CAUSE a2 | $y_{12}^1, y_{12}^2, \ldots, y_{12}^m$ |
| 13 | FAULT B DUE TO CAUSE b1 | $y_{13}^1, y_{13}^2, \ldots, y_{13}^m$ |
| 14 | FAULT B DUE TO CAUSE b2 | $y_{14}^1, y_{14}^2, \ldots, y_{14}^m$ |
| 15 | FAULT C DUE TO CAUSE c1 | $y_{15}^1, y_{15}^2, \ldots, y_{15}^m$ |
| 16 | FAULT C DUE TO CAUSE c2 | $y_{16}^1, y_{16}^2, \ldots, y_{16}^m$ |
| 17 | FAULT C DUE TO CAUSE c3 | $y_{17}^1, y_{17}^2, \ldots, y_{17}^m$ |

FIG. 11

| EVENTS | CARDINALITY DEGREE | | | |
|---|---|---|---|---|
| | ATTRIBUTE 1 | ATTRIBUTE 2 | ... | ATTRIBUTE m |
| FAULT A | $W_{11}$ | $W_{12}$ | ... | $W_{1m}$ |
| FAULT A DUE TO CAUSE a1 | $W_{111}$ | $W_{112}$ | ... | $W_{11m}$ |
| FAULT A DUE TO CAUSE a2 | $W_{121}$ | $W_{122}$ | ... | $W_{12m}$ |
| FAULT B | $W_{21}$ | $W_{22}$ | ... | $W_{2m}$ |
| FAULT B DUE TO CAUSE b1 | $W_{131}$ | $W_{132}$ | ... | $W_{13m}$ |
| FAULT B DUE TO CAUSE b2 | $W_{141}$ | $W_{142}$ | ... | $W_{14m}$ |
| FAULT C | $W_{31}$ | $W_{32}$ | ... | $W_{3m}$ |
| FAULT C DUE TO CAUSE c1 | $W_{151}$ | $W_{152}$ | ... | $W_{15m}$ |
| FAULT C DUE TO CAUSE c2 | $W_{161}$ | $W_{162}$ | ... | $W_{16m}$ |
| FAULT C DUE TO CAUSE c3 | $W_{171}$ | $W_{172}$ | ... | $W_{17m}$ |

FIG. 14

| DATA NUMBERS | TIME-SERIES DATA | EVENTS |
|---|---|---|
| 1 | $u_1^1, u_1^2, \ldots, u_1^m$ | NORMAL |
| 2 | $u_2^1, u_2^2, \ldots, u_2^m$ | NORMAL |
| ... | ... | ... |
| 11 | $u_{11}^1, u_{11}^2, \ldots, u_{11}^m$ | FAULT A OCCURRED DUE TO CAUSE a1 |
| ... | ... | ... |
| 21 | $u_{21}^1, u_{21}^2, \ldots, u_{21}^m$ | FAULT A OCCURRED DUE TO CAUSE a2 |
| ... | ... | ... |

FIG. 19

DATA OF LAYERED STRUCTURE

| FIRST LAYER | FAULT A (11, 12) | | FAULT B (13, 14) | | FAULT C (15, 16, 17) | | |
|---|---|---|---|---|---|---|---|
| SECOND LAYER | CAUSE a1 (11) | CAUSE a2 (12) | CAUSE b1 (13) | CAUSE b2 (14) | CAUSE c1 (15) | CAUSE c2 (16) | CAUSE c3 (17) |

DIAGNOSTIC DEVICE

REFERENCE TO RELATED APPLICATION

The present application is claiming the priority of the earlier Japanese patent application No. 2007-074011 filed on Mar. 22, 2007, the entire disclosure thereof being incorporated herein by reference thereto.

FIELD OF THE INVENTION

This invention relates to a diagnostic device that detects a fault produced in an object being diagnosed and that estimates the cause of the fault based on data inclusive of a plurality of attributes as measured from the object being diagnosed.

BACKGROUND OF THE INVENTION

In the management of systems of various sorts, such as various devices, plant equipment or network systems, it is necessary to promptly detect the occurrences of faults and to inquire into the causes of the faults as necessary. For this reason, a large variety of diagnostic devices that detect the faults and estimate the causes thereof based on data as measured from various parts of devices or systems of various sorts as the objects for diagnosis, have so far been proposed and put to practical use.

For example, Patent Document 1 has disclosed a diagnostic device for a sequential machine as an object for diagnosis. The diagnostic device holds in store a plurality of attribute values, indicating the normal operating conditions in each cycle of the sequential machine, as a criterion pattern. In actual management, a plurality of attribute values, indicating the operating conditions of the sequential machine for each machine cycle, are acquired to generate a pattern. This pattern is compared to a corresponding criterion pattern stored in a memory to detect a fault of the object being diagnosed. Patent Document 1 uses combinations of on/off operations of a plurality of limit switches that detect the movement of the sequential machine as a combination pattern of the values of a plurality of attributes.

Patent Document 2 discloses a diagnostic device in which, if such a fault has occurred that the value of a certain attribute in a time-series data of a plurality of attributes, as measured from an object for diagnosis, is offset from a criterion range, or if a user has specified an attribute subjected to a fault, a set or sets of attributes, the degree of correlation of which with the predetermined attributes subjected to the fault is higher than a predetermined criterion degree of correlation, is estimated to be the cause of the fault. More specifically, the degree of variations of the time series of a plurality of attributes with lapse of time is calculated based on the time-series data of the attributes in question. The degree of correlation, representing the intensity of correlation of the multiple attributes in question with other attributes, is calculated based on time-series data of the attributes in question and the other attributes. The set of the attributes, whose degree of correlation with the fault-related attributes is higher than a predetermined criterion degree of correlation, is output as the information indicating the cause of the fault.

[Patent Document 1] JP Patent Kokai Publication No. JP-A-59-218523

[Patent Document 2] JP Patent Kokai Publication No. JP-P2005-257416A

[Patent Document 3] JP Patent Kokai Publication No. JP-P2007-018530A

[Patent Document 4] JP Patent Kokai Publication No. JP-P2005-345154A

[Non-Patent Document 1] I. Takeuchi and K. Yamanishi, A unifying framework for detecting outliers and change points from time series, IEEE Transactions on Knowledge and Data Engineering, 18(4): 482-492, 2006

[Non-Patent Document 2] U. Lerner, Hybrid Bayesian Networks for Reasoning about Complex Systems, PHD thesis, Stanford University, 2002

[Non-Patent Document 3] M. M. Breuning, H. P. Kriegel, R. T. Ng, and J. Sander, LOF: Identifying density-based local outliers, In Proceedings of ACM SIGMOD Conference, ACM Press, 2000

SUMMARY

The above Patent Documents 1 to 4 and Non-Patent Documents 1 to 3 are incorporated herein by reference thereto. The following is an analysis of the related techniques by the present invention.

The conventional diagnostic devices suffer from the following problems in connection with detection of faults:

In Patent Document 1, the pattern of combination(s) of the values per se of multiple attributes, as measured from the object for diagnosis, are compared to the criterion pattern to detect the faults. Hence, if the values per se of an attribute at a given time point are not sufficient to give a decision on a fault, such that attribute values temporally before and after the given time point are also relevant in the fault, misdetection may be caused. It is now supposed that there are three attributes a, b and c, and that a fault of some sort or other arises only in case a state of a to c being all 1 has changed to a state of a to c being all 0. If, in such case, a criterion pattern of a to c all being 0 is used to effect pattern matching, the case where the state of the values of a and b being 1 and the value of c being 0 has changed to the state where only the values of a and b have changed to 0 is detected as indicating the occurrence of a fault. It is noted that, in Patent Document 2, the values of the degree of change of the multiple attributes, as measured from the object being diagnosed, are identified because attributes differing in units or domains cannot be directly compared to one another in finding the degree of correlation among the attributes. There lacks the concept of detecting a fault based on the degree of change as identified.

In addition, the conventional diagnostic device suffers from the following problem in connection with estimation of the causes of faults:

In a diagnostic device in which a set of attributes, whose degree of correlation with an attribute suffering a fault is higher than a predetermined criterion degree of correlation, is estimated to be the cause of the fault, as in Patent Document 2, the more complex the device or system being diagnosed, the larger is the number of candidates of the causes of the faults. Thus, it takes much time and labor until the true cause of the fault is identified. The reason may be such that, if the device being diagnosed is complicated, the number of parts that interrelate with one another is increased, with the result that the number of other attributes, strongly related with the attributes suffering from the fault, is appreciably increased.

The conventional diagnostic device also suffers a problem that, since the processing steps for detection of a fault differ from those for estimation of the cause for the fault, it is not possible to use the same calculation module (program) for detection of the fault and for estimation of its cause.

In view of the above depicted status of the art, it is an object of the present invention to provide a diagnostic device that detects a fault based on the degree of change of respective attributes of data inclusive of multiple attributes measured from the object being diagnosed.

It is another object of the present invention to provide a diagnostic device that may effectively locate the cause of faults by a narrowing-down (or focusing-up) technique based on the degree of change of attributes of data including a plurality of attributes as measured from the object being diagnosed.

It is yet another object of the present invention to provide a diagnostic device that is able to detect a fault and to estimate its cause by one and the same operational process.

In first and second aspects of the present invention, a diagnostic device and a method for diagnosis are provided, respectively.

In the first aspect of the present invention, there is provided a first diagnostic device comprising: a criterion change degree pattern memory and a change degree pattern diagnostic unit. The criterion change degree pattern memory holds in store a criterion change degree pattern in association with an event-to-be-diagnosed. The criterion change degree pattern is formed of a pattern of values of the degree of change of each attribute of data, including a plurality of attributes, as measured from an object being diagnosed. A change degree pattern diagnosis unit receives a diagnostic object change degree pattern to make diagnosis of the object based on the received diagnostic object change degree pattern and the criterion change degree pattern stored in the criterion change degree pattern memory. The diagnostic object change degree pattern is formed of a pattern of values of the degree of change of each attribute of data, including a plurality of attributes, of the object being diagnosed, as measured from the object being diagnosed.

A second diagnostic device includes, in the first diagnostic device, a diagnostic object change degree pattern generation unit for calculating the degree of change of each attribute of the data, including a plurality of attributes, of the object being diagnosed, measured from the object being diagnosed, to generate the diagnostic object change degree pattern. The diagnostic object change degree pattern is a combination of values of the degree of change of the attributes calculated.

In a third diagnostic device of the present invention, the change degree pattern diagnosis unit in the first or second diagnostic device effects pattern matching between the diagnostic object change degree pattern and the criterion change degree pattern stored in the criterion change degree pattern memory to make diagnosis based on an outcome of the pattern matching.

A fourth diagnostic device includes, in the second or third diagnostic device, an attribute cardinality degree memory that holds in store the degree of cardinality of the attributes in association with an event-to-be-diagnosed. In effecting pattern matching between the criterion change degree pattern associated with the event-to-be-diagnosed and the diagnostic object change degree pattern, the change degree pattern diagnosis unit takes into account the degree of cardinality of the attributes stored in the attribute cardinality degree memory in association with the event-to-be-diagnosed of the criterion change degree pattern.

In a fifth diagnostic device, the criterion change degree pattern memory in the third or fourth diagnostic device holds in store the criterion change degree pattern, in accordance with a layered structure of an event-to-be-diagnosed, from one layer to another. The change degree pattern diagnosis unit effects diagnosis by pattern matching using the criterion change degree pattern belonging to an upper layer. The change degree pattern diagnosis unit effects pattern matching using the criterion change degree pattern belonging to a lower layer based on an outcome of diagnosis for the upper layer.

In a sixth diagnostic device, the criterion change degree pattern memory of the third to fifth diagnostic devices of the present invention holds in store a criterion change degree pattern associated with a fault-related event. The change degree pattern diagnosis unit outputs a fault-related event associated with the criterion change degree pattern matched to the diagnostic object change degree pattern as the outcome of the diagnosis.

In a seventh diagnostic device, the criterion change degree pattern memory of the sixth diagnostic device further holds in store a criterion change degree pattern associated with a normal event. The change degree pattern diagnosis unit outputs, in connection with the diagnostic object change degree pattern not matched to any criterion change degree pattern associated with a normal event or to any criterion change degree pattern associated with the fault-related event, an outcome of the diagnosis to the effect that the diagnostic object change degree pattern is of an unknown fault.

In an eighth diagnostic device, the change degree pattern diagnosis unit of the first or second diagnostic device learns a set of diagnostic rules for diagnosing the state of the object for diagnosis from a change degree pattern, using the criterion change degree pattern stored in the criterion change degree pattern memory. The change degree pattern diagnosis unit applies the diagnostic rules learned to the diagnostic object change degree pattern to diagnose the object.

A ninth diagnostic device of the present invention includes, in the eighth diagnostic device, an attribute cardinality degree memory that holds in store the degree of cardinality of the attributes in association with an event-to-be-diagnosed. In learning the diagnostic rules using the criterion change degree pattern associated with the event-to-be-diagnosed, the change degree pattern diagnosis unit takes into account the degree of cardinality of the attributes stored in the attribute cardinality degree memory in association with the event-to-be-diagnosed of the criterion change degree pattern.

In a tenth diagnostic device of the present invention, the eighth or ninth diagnostic device includes a layered structure memory for holding in store the data of a layered structure for an event-to-be-diagnosed. The change degree pattern diagnosis unit learns a diagnostic rule for diagnosing the event belonging to the layer from one layer stored in the layered structure memory.

In an eleventh diagnostic device of the present invention, the change degree pattern diagnosis unit of the eighth diagnostic device learns a diagnostic rule for detecting a normal state in addition to a diagnostic rule for detecting a fault. For the diagnostic object change degree pattern that has not been diagnosed to be normal under the diagnostic rules to detect a normal state, and that has not been detected to be fault-related under a diagnostic rule to detect a fault, at the time of the diagnosis, the change degree pattern diagnosis unit outputs an outcome of diagnosis to the effect that the diagnostic object change degree pattern is of an unknown fault.

A twelfth diagnostic device of the present invention includes, in the first diagnostic device, a criterion change degree pattern generation device that generates a criterion change degree pattern to be stored in the criterion change degree pattern memory. The criterion change degree pattern generation device includes a learning data memory that holds in store time-series data including a plurality of attributes as measured from the object being diagnosed, in association with an event. The criterion change degree pattern generation device also includes a change degree pattern generation unit.

The change degree pattern generation unit reads out time-series data from the learning data memory, calculates the degree of change with time of the attributes included in the time-series data, from one time-series data to another. The change degree pattern generation unit also generates a pattern corresponding to a combination of values of the degree of change of the attributes as a change degree pattern associated with the event of the time-series data. The criterion change degree pattern generation device further includes a change degree pattern outputting unit for outputting the change degree pattern generated by the change degree pattern generation unit.

A thirteenth diagnostic device of the present invention includes, in the fourth or ninth diagnostic device, an attribute cardinality degree generation device that generates the attribute cardinality degree to be stored in the attribute cardinality degree memory. The attribute cardinality degree generation device includes a criterion change degree pattern memory that holds in store, in association with an event-to-be-diagnosed, a criterion change degree pattern formed by a pattern of values of the degree of change of each attribute of data, including a plurality of attributes measured from the object being diagnosed. The attribute cardinality degree generation device also includes an attribute cardinality degree determining unit for reading out the criterion change degree patterns from the criterion change degree pattern memory and for determining the degree of cardinality of the attributes in the criterion change degree patterns associated with the events-to-be-diagnosed, from one of the events to another. The attribute cardinality degree generation device further includes an attribute cardinality degree outputting unit for outputting the cardinality degree of the attributes determined by the attribute cardinality degree determining unit from one event to another.

A fourteenth diagnostic device of the present invention includes, in the fifth or tenth diagnostic device, an attribute cardinality degree generation device that generates the attribute cardinality degree to be stored in the attribute cardinality degree memory. The attribute cardinality degree generation device includes a criterion change degree pattern memory. The criterion change degree pattern memory holds in store, in association with an event-to-be-diagnosed, a criterion change degree pattern formed by a pattern of values of the degree of change of each attribute of data, including a plurality of attributes measured from the object being diagnosed. The attribute cardinality degree generation device also includes a layered structure memory that holds in store the data of a layered structure of an event-to-be-diagnosed. The attribute cardinality degree generation device further includes an attribute cardinality degree determining unit for reading out data of the layered structure from the layered structure memory and reading out the criterion change degree pattern from the criterion change degree pattern memory. The attribute cardinality degree determining unit determines the degree of cardinality of the attributes in the criterion change degree pattern associated with the event for each layer, as the object-to-be-diagnosed, from one event to another. The attribute cardinality degree generation device further includes an attribute cardinality degree outputting unit for outputting the cardinality degree of each of the attributes determined by the attribute cardinality degree determining unit on the event-by-event basis.

In a second mode of the present invention, there is provided a method for diagnosis comprising: a first step of change degree pattern diagnosis unit receiving a diagnostic object change degree pattern formed of a pattern of values of the degree of change of each attribute of data, including a plurality of attributes, measured from an object being diagnosed.

The method for diagnosis also comprises a second step of the change degree pattern diagnosis unit reading out the criterion change degree pattern from the criterion change degree pattern memory and effecting diagnosis of the object being diagnosed based on the received diagnostic object change degree pattern and the criterion change degree pattern read out. The criterion change degree pattern memory holds in store the criterion change degree pattern formed of a pattern of values of the degree of change of each attribute of data, including a plurality of attributes, measured from the object being diagnosed in association with the event-to-be-diagnosed.

A second method for diagnosis of the present invention includes, in the first method for diagnosis, a third step of the diagnostic object change degree pattern generation unit calculating the degree of change of each attribute of the data, including a plurality of attributes, of the object being diagnosed measured from the object being diagnosed to generate the diagnostic object change degree pattern. The diagnostic object change degree pattern is the combination of values of the degree of change of the attributes calculated.

A third method for diagnosis of the present invention includes, in the first or second diagnostic method, a step of the change degree pattern diagnosis unit effecting pattern matching between the diagnostic object change degree pattern and the criterion change degree pattern stored in the criterion change degree pattern memory to diagnose the object for diagnosis based on an outcome of the pattern matching.

A fourth method for diagnosis of the present invention includes, in the second or third method for diagnosis, a step of the change degree pattern diagnosis unit reading out, in effecting pattern matching between a criterion change degree pattern associated with an event-to-be-diagnosed and the diagnostic object change degree pattern, the degree of cardinality of the attributes of the criterion change degree pattern, associated with the event-to-be-diagnosed, from the attribute cardinality degree memory. The pattern matching thus may take into account the degree of cardinality of the attributes read out. The attribute cardinality degree memory holds in store the degree of cardinality of the attributes in association with the event-to-be-diagnosed.

A fifth method for diagnosis of the present invention includes, in the third to fifth diagnostic methods, a step of the criterion change degree pattern memory holding in store, in accordance with a layered structure of an event-to-be-diagnosed, the criterion change degree patterns from one layer to another, and a step of the change degree pattern diagnosis unit effecting diagnosis by pattern matching using the criterion change degree patterns of an upper layer. The change degree pattern diagnosis unit effects pattern matching using the criterion change degree pattern of a lower layer based on an outcome of diagnosis for the upper layer.

A sixth method for diagnosis of the present invention includes, in the sixth method for diagnosis, a step of the criterion change degree pattern memory holding in store a criterion change degree pattern associated with a fault-related event and a step of the change degree pattern diagnosis unit outputting a fault-related event associated with the criterion change degree pattern matched to the diagnostic object change degree pattern as the outcome of the diagnosis.

A seventh method for diagnosis of the present invention includes, in the sixth method for diagnosis, a step of the criterion change degree pattern memory further holding in store a criterion change degree pattern associated with a normal event, and a step of the change degree pattern diagnosis unit outputting, in connection with the diagnostic object change degree pattern not matched to any criterion change degree pattern associated with a normal event or to any criterion change degree pattern associated with the fault-related event, an outcome of the diagnosis to the effect that the diagnostic object change degree pattern is of an unknown fault.

An eighth method for diagnosis of the present invention includes, in the first or second method for diagnosis, a step of the change degree pattern diagnosis unit learning a set of diagnostic rules for diagnosing the state of the object for diagnosis from a change degree pattern, using the criterion change degree pattern stored in the criterion change degree pattern memory. The eighth method for diagnosis further includes a step of the change degree pattern diagnosis unit applying a diagnostic rule(s) learned to the diagnostic object change degree pattern to diagnose the object being diagnosed.

A ninth method for diagnosis of the present invention includes, in the eighth methods for diagnosis, a step of the change degree pattern diagnosis unit reading out the degree of cardinality of the attributes of the criterion change degree pattern, associated with the event-to-be-diagnosed, from an attribute cardinality degree memory, in learning a diagnostic rule(s) using a criterion change degree pattern associated with a certain event-to-be-diagnosed. The attribute cardinality degree memory holds in store the degree of cardinality of the attributes in association with the event-to-be-diagnosed. The ninth method for diagnosis also includes a step of the change degree pattern diagnosis unit learning a diagnostic rule(s) in consideration of the degree of cardinality of the attributes read out.

In a tenth method for diagnosis of the present invention, the eighth or ninth method for diagnosis includes a step of the change degree pattern diagnosis unit learning a diagnostic rule(s) for diagnosing the event belonging to the layer for each layer stored in the layered structure memory. The memory of the layered structure holds in store the data of the layered structure of the event as an object-to-be-diagnosed.

In an eleventh method for diagnosis of the present invention, the eighth method for diagnosis includes a step of the change degree pattern diagnosis unit learning a diagnostic rule(s) for detecting a normal state in addition to a diagnostic rule(s) for detecting a fault. The eleventh method for diagnosis of the present invention also includes a step of the change degree pattern diagnosis unit outputting an outcome of diagnosis to the effect that the diagnostic object change degree pattern is of an unknown fault in connection with a diagnostic object change degree pattern that has not been diagnosed to be normal, at the time of the diagnosis, under the diagnostic rules to detect a normal state, and that has not been detected to be fault-related under the diagnostic rules to detect a fault.

In a third aspect of the present invention, there is provided a computer-readable program that allows a computer to implement the diagnostic device and the method for diagnosis as set forth above.

In fourth and fifth aspects of the present invention, there are provided the criterion change degree pattern generation device and the attribute cardinality degree generation device as set forth in the first and second aspects, respectively.

[Operation]

Each of a plurality of attributes, measured from an object being diagnosed, is changed in dependence upon the operating states of the object being diagnosed. Thus, if the degree of such change is detected from one attribute to another, the degree of change of each attribute is changed in dependence upon the operating states of the object being diagnosed. Hence, if a combination of the degree of change of each attribute at a given time instant is captured as a pattern, such pattern may be regarded to be a pattern that characterizes the operating state of the object being diagnosed at the given time instant. That is, if the operating state at the given time instant of the object being diagnosed be normal, such pattern characterizes the normal operating state of the object being diagnosed; whereas if a fault A has occurred at the given time instant such pattern characterizes the operating state at which the fault A occurred in the object being diagnosed. Thus, if a pattern with which the fault A occurred in a past instance is stored as criterion change degree pattern in a criterion change degree pattern memory, it is possible to detect whether or not the fault has occurred in an object being diagnosed by comparing a change degree pattern identified by calculations from the multiple attributes as measured from the object being diagnosed to the criterion change degree pattern. It is because the presentation of the same operating state as that of the object being diagnosed at the past time instant of the occurrence of the fault A indicates that the possibility of the occurrence of the same fault in the object being diagnosed is extremely high. Fault(s) other than the fault A may similarly be detected by providing a corresponding criterion change degree pattern. It may be observed in general that, if a fault has occurred in the object being diagnosed, at least any one operating state is necessarily changed. Thus, as long as a sufficient number of attributes are measured, there is basically no fault that may not be detected by the change degree pattern. It is thus possible to detect the faults based on the degree of change of a plurality of attributes of data measured from the object being diagnosed.

Moreover, if the cause of the fault A has been identified by any past instance of occurrence of the fault A in the object being diagnosed, the cause of the fault may be estimated in case the fault A has occurred again. It is now assumed that, in past instances, there are two patterns A1 and A2 as the criterion change degree patterns for the fault A, and that the result of analysis indicates that the cause of occurrence of the fault A in the pattern A1 is a1 while that in the pattern A2 is a2. In such case, the patterns A1 and A2 are stored in the criterion change degree pattern memory in association with an event that the fault A has occurred due to the cause a1 and an event that the fault A has occurred due to the cause a2, respectively. The change degree pattern found on calculations from the multiple attributes measured from the object being diagnosed is compared with the criterion change degree pattern.

If the change degree pattern has matched the pattern A1, it may be estimated that the fault occurred due to the cause a1. In similar manner, if the change degree pattern has matched the pattern A2, it may be estimated that the fault occurred due to the cause a2. It is thus possible to effectively find out the cause of the fault by a narrowing-down (or focusing-up) technique based on the change degree of each attribute of data including the multiple attributes as measured from the object being diagnosed.

It is seen from above that the sequence of operations for the fault detection and that for finding its cause are the same except that the criterion change degree patterns used are different. Hence, the same module for calculation (program) may be used for detecting a fault and for estimating its cause.

In the foregoing explanation, diagnosis is performed by pattern matching between a criterion change degree pattern and a diagnostic object change degree pattern. It is however also possible to use the criterion change degree pattern to learn the diagnostic rule(s) to estimate the state of the object being diagnosed from the change degree pattern and to apply the so learned diagnostic rule(s) to the diagnostic object change degree pattern to diagnose the object.

According to the present invention, not only the fault that may be determined to be a fault with the aid of the attribute value per se but also such fault that may be determined to be a fault with the aid of both temporally leading and trailing attribute values. It is because the fault may be detected based on the change degree of each attribute measured from the object being diagnosed.

Also, according to the present invention, it is possible to detect not only a fault that may be determined to be a fault only from the change degree of each attribute, but also a fault in which the change degree values of a plurality of attributes are involved in fault detection. It is because a fault may be detected based on a criterion change degree pattern generated based on past instances and a diagnostic object change degree pattern, with each pattern being a combination of values of the change degree of multiple attributes.

Moreover, according to the present invention, the cause of a fault that has occurred in an object being diagnosed may effectively be identified by a narrowing-down technique using past instances. It is because the cause of the fault may be estimated based on the criterion change degree pattern generated from past instances and the diagnostic object change degree pattern.

According to the present invention, the same module for calculations (program) may be used to detect a fault and to estimate the cause of the fault detected. It is because only the criterion change degree patterns used for detecting a fault and those used for estimating its cause differ, with the sequence for processing being the same.

BRIEF DESCRIPTION OF THE DRAWINGS

FIG. 2 is a tabulated view showing examples of criterion change degree patterns stored in a criterion change degree pattern memory of a diagnostic device of the first exemplary embodiment of the present invention.

FIG. 4 is a tabulated view showing other examples of criterion change degree patterns stored in the criterion change degree pattern memory of the diagnostic device of the first exemplary embodiment of the present invention.

FIG. 5 is a tabulated view showing further examples of criterion change degree patterns stored in the criterion change degree pattern memory of the diagnostic device of the first exemplary embodiment of the present invention.

FIG. 8 is a tabulated view showing examples of data stored in an attribute cardinality degree memory of the diagnostic device of the second exemplary embodiment of the present invention.

FIG. 10 is a tabulated view showing examples of criterion change degree patterns stored in a layered criterion change degree pattern memory of the diagnostic device of the third exemplary embodiment of the present invention.

FIG. 11 is a tabulated view showing examples of data stored in an attribute cardinality degree memory of the diagnostic device of the third exemplary embodiment of the present invention.

FIG. 14 is a tabulated view showing examples of data stored in a learning data memory of the criterion change degree pattern generation device.

FIG. 19 is a tabulated view showing an example of data of a layered structure used in the attribute cardinality degree pattern generation device.

EXPLANATION OF REFERENCE SYMBOLS

Figure 1:
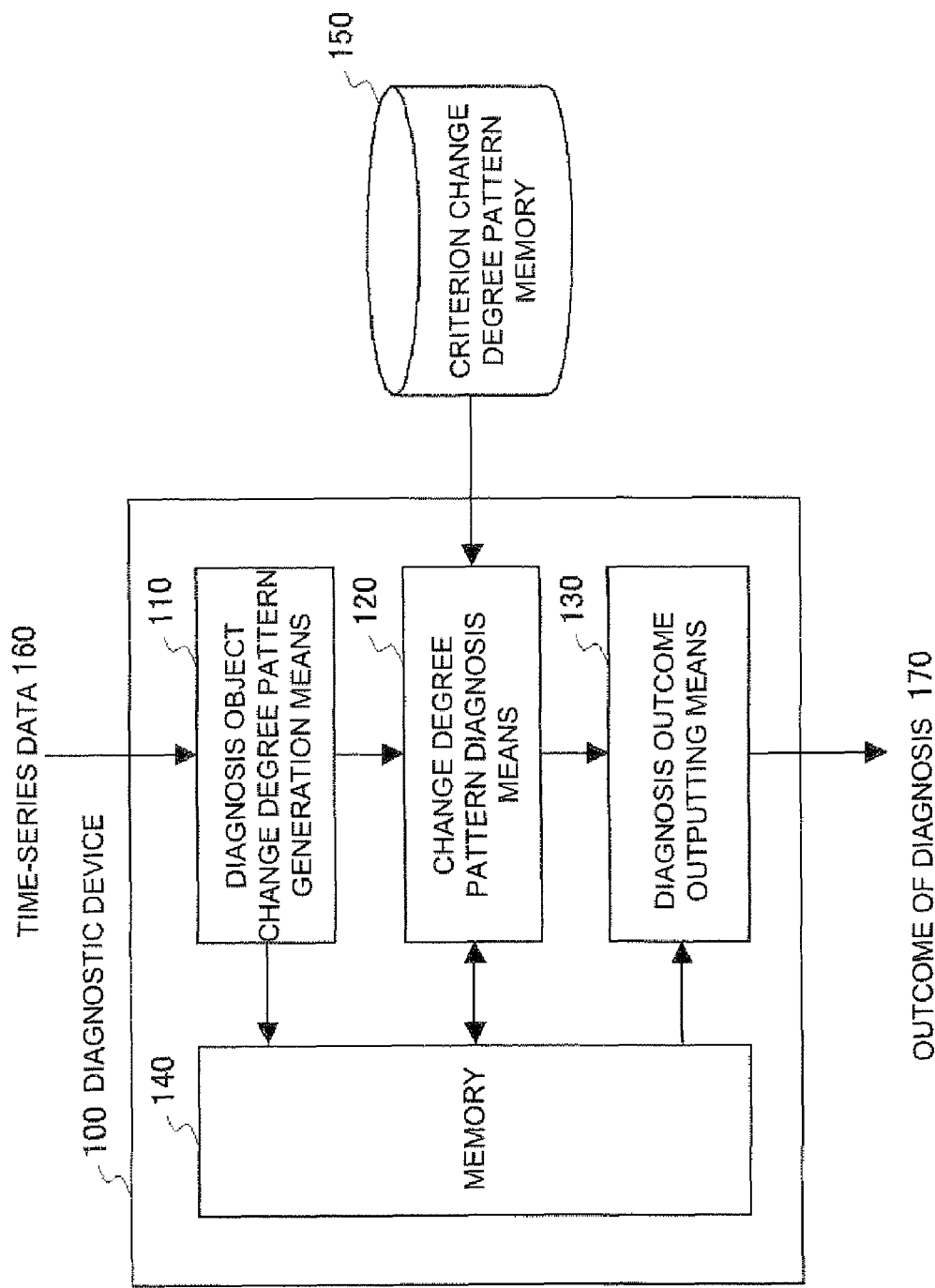
FIG. 1 is a block diagram showing a diagnostic device according to a first exemplary embodiment of the present invention.

100 diagnostic device
110 diagnostic object change degree pattern generation means
120 change degree pattern diagnosis unit
130 diagnosis outcome outputting unit
140 memory
150 criterion change degree pattern memory
160 time-series data
170 outcome of diagnosis

PREFERRED MODES

[First Exemplary Embodiment]

Referring to FIG. 1, a diagnostic device 100 according to a first exemplary embodiment of the present invention includes a diagnostic object change degree pattern generation unit 110, a change degree pattern diagnosis unit 120, a diagnosis outcome outputting unit 130 and a memory 140. A criterion change degree pattern memory 150 is connected to the diagnostic device 100. The diagnostic device 100 inputs a time-series data 160, including a plurality of attributes, as measured from an object being diagnosed, not shown. The diagnostic device compares a diagnostic object change degree pattern, generated from the time-series data 160, to a plurality of criterion change degree patterns, stored in the criterion change degree pattern memory 150, to detect the occurrence of a fault in the object being diagnosed. The diagnostic device also estimates the cause of the fault that has occurred to output an outcome of diagnosis 170.

With the number m of the attributes contained in the time-series data 160, the time-series data 160 is composed of respective time-series data of the m-number of attributes. In the following, an i'th time-series data is labeled $u_i$. A j'th attribute is labeled $u^j$ and the j'th number attribute in the time-series data $u_i$ is labeled $u_i^j$. The value of each attribute may be a real number or a symbol value.

Initially, the diagnostic object change degree pattern generation unit 110 inputs the time-series data 160, and calculates the values of the time-series change degree of each of the attributes u contained in the time-series data. The time-series change degree indicates the manner the attribute values are changed with lapse of time. The time-series change degree may be calculated by any suitable optional methods, and the values of the change degree of the calculated outcomes may be real values or symbol values. The diagnostic object change degree pattern generation unit 110 then generates, as a diagnostic object change degree pattern of the time series data, a pattern of combination of values of the change degree of the respective attributes $u^j$ contained in the same time-series data. The diagnostic object change degree pattern generation unit then causes the so generated pattern to be recorded in the memory 140. For example, if the change degree values of the attributes $u^1, u^2, \ldots, u^m$ contained in a time-series data $u_1$ are respectively labeled $z_1^1, z_1^2, \ldots, z_1^m$, $(z_1^1, z_1^2, \ldots, z_1^m)$ is stored as the diagnosis pattern change degree pattern of the time series data $u_1$ in the memory 140. In this case, the original time-series data 160 may be recorded in the memory as a set with the diagnostic object change degree pattern.

The criterion change degree pattern memory 150 holds in store one or more criterion change degree pattern in association with each event which is to be an object for diagnosis (may be termed "object-to-be-diagnosed"). The event which is to be the object for diagnosis may be exemplified by an event that there is a fault A that has occurred, an event that the cause of the fault A is a1, and an event that no fault has occurred such that the operating condition is normal. The criterion change degree pattern, associated with an event, is a pattern of combination of values of the change degree of respective attributes that characterize the operating conditions of the object for diagnosis at the time of occurrence of the event. The criterion change degree pattern is formulated based on past instances and stored in the criterion change degree pattern memory 150. For example, if, in a past instance, it has been confirmed that the fault A occurred when the values of the change degree at a certain time t of attributes $u^1$ to $u^m$ of the object for diagnosis are $y_1^1, y_1^2, \ldots, y_1^m$, then $(y_1^1, y_1^2, \ldots, y_1^m)$ may be used as the criterion change degree pattern associated with the event that the fault A has occurred.

If there are a plurality of past instances of occurrence of the fault A, an expected value as a simplistic or weighted average value thereof may be identified and used as the criterion change degree pattern. Also, if it has been confirmed in past events that no fault occurred and the operation state is normal under the situation that the values of the change degree at a time t of the attributes $u^1$ to $u^m$ of the object being diagnosed are $x_1^1, x_1^2, \ldots, x_1^m$, then $(x_1^1, x_1^2, \ldots, x_1^m)$ may be used as the criterion change degree pattern associated with the event that the operating condition is normal.

The change degree pattern diagnosis unit 120 reads out a diagnostic object change degree pattern, generated by the diagnostic object change degree pattern generation unit 110, from the memory 140. The change degree pattern diagnosis unit compares the so read out pattern to the criterion change degree pattern as read out from the criterion change degree pattern memory 150 to detect the criterion change degree pattern matched to the diagnostic object change degree pattern.

Specifically, the degree of similarity between respective patterns is pre-defined, and the degree of similarity between the diagnostic object change degree pattern and the criterion change degree pattern is calculated based on such definition. Pattern matching is checked depending on whether the degree of similarity as calculated meets a pre-determined condition. The higher the degree of similarity, the larger may be the value of the degree of similarity defined. Or, the higher the degree of similarity, the smaller may be the value of the degree of similarity defined. In the following description, it is assumed that the value of the degree of similarity to be used becomes small with increase with increase in the degree of similarity.

The change degree pattern diagnosis unit 120 compares the degree of similarity calculated to a predetermined threshold value and, if the degree of similarity calculated is not larger than the threshold value, gives a decision that the two are matched to each other. The change degree pattern diagnosis unit 120 records the event, corresponding to the criterion change degree pattern matched, in the memory 140 as the outcome of diagnosis. If the diagnostic object change degree pattern has matched a plurality of criterion change degree patterns, only the event associated with the criterion change degree pattern with the smallest criterion degree value may be output as being the outcome of diagnosis. Or, the total or a certain number of upper order criterion change degree patterns may be ranked in the sequence of the increasing degree of similarity, and the events associated with those criterion change degree patterns may be output. As regards the diagnostic object change degree pattern that has not been matched to any of the criterion change degree patterns, associated with an event indicating a normal operating condition, or to any of criterion change degree patterns, associated with an event indicating a fault, it is likely that an unknown fault has occurred. Hence, the outcome of diagnosis indicating that effect may be output. The original time-series data or the diagnostic object change degree pattern may also be included in the outcome of diagnosis.

The diagnosis outcome outputting unit 130 reads out the outcome of diagnosis, recorded by the change degree pattern diagnosis unit 120, from the memory 140, and outputs the outcome as being the outcome of diagnosis 170. The output destination may be an output device connected to the diagnostic device 100. The output destination may also be an output device or a terminal device attached to a network.

An example operation of the entire diagnostic device 100 of the present exemplary embodiment is now described in detail.

In detecting a fault of an object being diagnosed, with the use of the diagnostic device 100, the criterion change degree pattern of each of the faults, desired to be detected, is stored in the criterion change degree pattern memory 150, as shown for example in FIG. 2. In the example of FIG. 2, there are stored three criterion change degree patterns $y_1$ ($y_1^1$, $y_1^2$, ..., $y_1^m$), $y_2$ ($y_2^1$, $y_2^2$, ..., $y_2^m$) and $y_3$ ($y_3^1$, $y_3^2$, ..., $y_3^m$) of pattern numbers of from 1 to 3. The patterns $y_1$, $y_z$ and $y_3$ are associated with the events indicating that the faults A, B and C have occurred, respectively.

Figure 3:
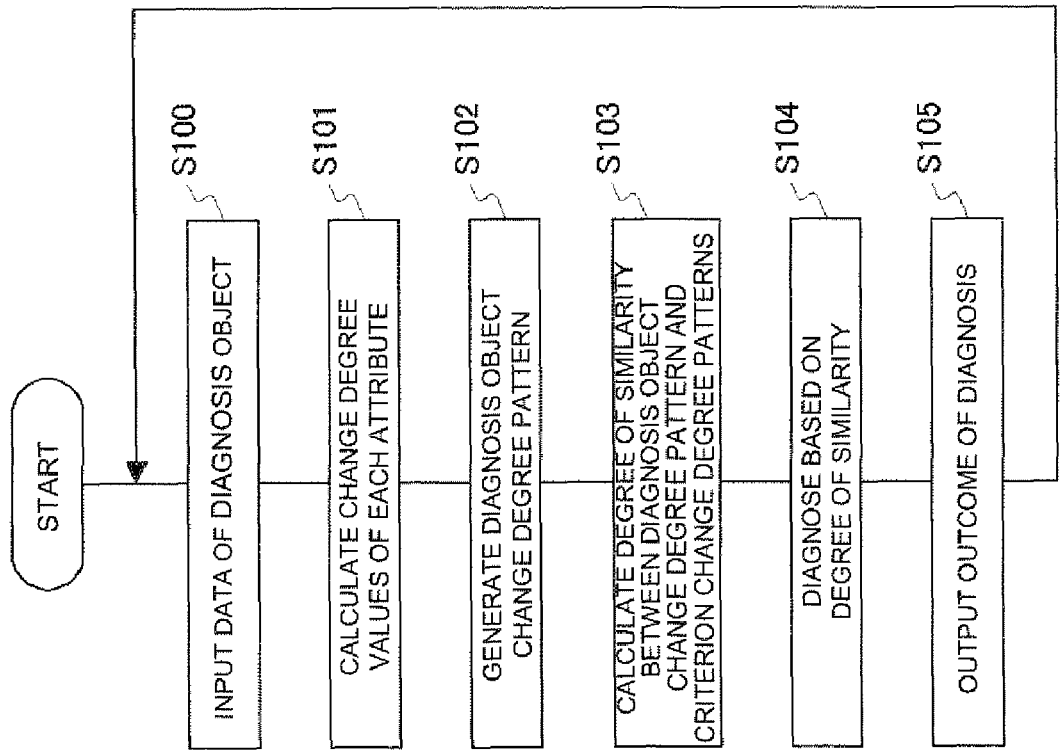
FIG. 3 is a flowchart showing an example processing by the diagnostic device of the first exemplary embodiment of the present invention.

Referring to FIG. 3, the diagnostic object change degree pattern generation unit 110 of the diagnostic device 100 inputs a time-series data 160, including an m-number of attributes, as measured at time t1, from the object being diagnosed, as data of the object-to-be-diagnosed (S100). The diagnostic object change degree pattern generation unit then calculates the degree of change of each attribute contained in the time-series data 160 (S101). The diagnostic object change degree pattern generation unit then generates a pattern, which is a combination of the values of the degree of change of the respective attributes, as a single diagnostic object change degree pattern, to record the so generated diagnostic object change degree pattern in the memory 140 (S102). The generated diagnostic object change degree pattern is labeled $z_1$ ($z_1^1$, $z_1^2$, ..., $z_1^m$).

The change degree pattern diagnosis unit 120 then reads out the diagnostic object change degree pattern $z_1$ from the memory 140 and calculates values of the degree of similarity $d(z_1, y_1)$, $d(z_1, y_2)$ and $d(z_1, y_3)$ between the diagnostic object change degree pattern and the criterion change degree patterns $y_1$, $y_2$ and $y_3$ of the pattern numbers 1 to 3 stored in the criterion change degree pattern memory 150 (step S103). The degree of similarity between the patterns may be defined as the sum of squares of the differences between the values of the degree of similarity of the same attributes, as shown by the equation (1):

$$d(z,y) = \sum_{i=1}^{m}(z^i - y^i)^2 \quad (1)$$

Of course, the degree of similarity between the patterns is not limited to that by the equation (1), such that it is possible to define the value derived by preset operations from the degree of similarity calculated from the equation (1) as the degree of similarity.

The change degree pattern diagnosis unit 120 then compares each of the values of the degree of similarity $d(z_1, y_1)$, $d(z_1, y_2)$ and $d(z_1, y_3)$ between the diagnostic object change degree pattern $z_1$ and the criterion change degree patterns $y_1$, $y_2$ and $y_3$ to a threshold value dst. The change degree pattern diagnosis unit takes the event corresponding to the criterion change degree pattern bearing the degree of similarity smaller than the threshold value dst to be the outcome of diagnosis to record it in the memory 140 (S104). For example, if only the value of the degree of similarity $d(z_1, y_1)$ out of the three values of the degree of similarity $d(z_1, y_1)$, $d(z_1, y_2)$ and $d(z_1, y_3)$ is smaller than the threshold value dst, the change degree pattern diagnosis unit diagnoses that the fault A has occurred.

The diagnosis outcome outputting unit 130 reads out the outcome of diagnosis of the change degree pattern diagnosis unit 120 from the memory 140 to output the so read out outcome of diagnosis (S105). In the above Example, the purport that the fault A has been detected is output. If none of the faults has been detected, the purport that the operating condition is normal may be output as being the outcome of the diagnosis.

On completion of the processing for diagnosis for the time-series data 160, inclusive of the m-number of attributes, as measured at time t1 from the object-to-be-diagnosed, the diagnostic device 100 reverts to the step S100 to reiterate the processing on the time-series data 160 as measured at the next time point.

In the above example operation, the fault in the object being diagnosed is detected using the diagnostic device 100. It is however also possible to detect a fault and estimate its cause for the object being diagnosed, using the diagnostic device 100, provided that the criterion change degree patterns are changed. Examples of the criterion change degree patterns, used in this case, are shown in FIG. 4. In FIG. 4, seven criterion change degree patterns of from a pattern number 11 to a pattern number 17, namely $y_{11}$ ($y_{11}^1$, $y_{11}^2$, ..., $y_{11}^m$), $y_{12}$ ($y_{12}^1$, $y_{12}^2$, ..., $y_{12}^m$), $y_{13}$ ($y_{13}^1$, $y_{13}^2$, ..., $y_{13}^m$), $y_{14}$ ($y_{14}^1$, $y_{14}^2$, ..., $y_{14}^m$), $y_{15}$ ($y_{15}^1$, $y_{15}^2$, ..., $y_{15}^m$), $y_{16}$ ($y_{16}^1$, $y_{16}^2$, ..., $y_{16}^m$), and $y_{17}$ ($y_{17}^1$, $y_{17}^2$, ..., $y_{17}^m$), are used. Of these, the patterns $y_{11}$ and $y_{12}$ are criterion change degree patterns that indicate the occurrence of the fault A and that are useful in estimating the causes of the fault. Specifically, the pattern $y_{11}$ is a pattern characterizing the occurrence of the fault A by the cause a1 and the pattern $y_{12}$ is a pattern characterizing the occurrence of the fault A by the cause a2. The patterns $y_{13}$ and $y_{14}$ are criterion change degree patterns that indicate the occurrence of the fault B and that are useful in estimating the causes of the fault. Of these, the pattern $y_{13}$ is a pattern characterizing the occurrence of the fault B by the cause b1 and the pattern $y_{14}$ is a pattern characterizing the occurrence of the fault B by the cause b2. The patterns $y_{15}$, $y_{16}$ and $y_{17}$ are criterion change degree patterns that indicate the occurrence of the fault C and that are useful in estimating the causes of the fault. Of these, the pattern $y_{15}$ is a pattern characterizing the occurrence of the fault C by the cause c1, the pattern $y_{16}$ is a pattern characterizing the occurrence of the fault C by the cause c1 and the pattern $y_{17}$ is a pattern characterizing the occurrence of the fault C by the cause c3.

The operation of the diagnostic device 100, employing the criterion change degree patterns of FIG. 4, is wholly the same as that of the diagnostic device 100 employing the criterion change degree pattern of FIG. 2. For example, if, out of the values of the degree of similarity $d(z_1, y_{11})$, $d(z_1, y_{12})$, $d(z_1, y_{13})$, $d(z_1, y_{14})$, $d(z_1, y_{15})$, $d(z_1, y_{16})$ and $d(z_1, y_{17})$ between the diagnostic object change degree pattern z1, generated from the time-series data 160, and the criterion change degree patterns y11 to y17, only the value of the degree of similarity $d(z_1, y_{11})$ is smaller than the threshold value dst, a diagnosis is made that the fault A by the cause a1 has occurred.

In the above example operation, only the pattern at the time of fault occurrence is used as a criterion change degree pattern. Unknown abnormal situations may, however, be detected by simultaneously using criterion change degree patterns for a normal operation. Examples of the criterion change degree patterns, used at such time, are shown in FIG. 5. In the example of FIG. 5, three criterion change degree patterns for faults, similar to those shown in FIG. 2, and an n-number of criterion change degree patterns $x_1$($x_1^1$, $x_1^2$, ..., $x_1^m$), $x_2$($x_2^1$, $x_2^2$, ..., $x_2^m$), ..., $x_n$($x_n^1$, $x_n^2$, ..., $x_n^m$) for the normal operation, are used.

The operation of the diagnostic device 100, employing the criterion change degree patterns of FIG. 5, is wholly the same as that of the diagnostic device 100, employing the criterion change degree patterns of FIG. 2, except the processing of step S104 of FIG. 3. In the present Example, the following processing is carried out at the step S104.

Initially, the change degree pattern diagnosis unit 120 scrutinizes if, among the values of the degree of similarity $d(z_1,$ $y_1$), $d(z_1, y_2)$ and $d(z_1, y_3)$ between the diagnostic object change degree pattern $z_1$ generated from the time-series data 160 and the criterion change degree patterns for normal operation x1 to xn, out of the values of the degree of similarity $(d(z_1, y_1), d(z_1, y_2) d(z_1, y_3), d(z_1, x_1), d(z_1, x_2), \ldots, d(z_1, x_n))$ between the diagnostic object change degree pattern $z_1$ and the criterion change degree patterns $y_1$ to $y_3$ and $x_1$ to $x_n$, there is any value smaller than the threshold value dst. If there is at least one criterion change degree pattern for the normal operation, whose value of the similarity degree is smaller than the threshold value dst, the change degree pattern diagnosis unit gets the outcome for diagnosis to the effect that the operation is normal. If there is none of the values of the degree of similarity for the normal operation smaller than the threshold value dst, the change degree pattern diagnosis unit scrutinizes whether or not there is a value of the degree of similarity smaller than the threshold value dst among the values of the degree of similarity $d(z_1, y_1)$, $d(z_1, y_2)$ $d(z_1, y_3)$ between the pattern z1 and the values of the criterion change degree pattern y1 to y3 indicating the fault occurrence. If there is a value of the criterion change degree pattern for an abnormal operation smaller than the threshold value dst, a diagnosis is made that a corresponding fault has occurred. If none of the values of the degree of similarity of the criterion change degree patterns is smaller than the threshold value, a diagnosis is made to the effect that a fault of an unknown nature has occurred.

If the outcome of diagnosis to the effect that the fault of an unknown nature has occurred is output from the diagnosis outcome outputting unit 130, an analysis is made by, for example, an expert, based on the diagnostic object change degree pattern $z_1$ and the original time-series data 160. If the unusual situation has actually been confirmed to be a fault D, the outstanding diagnostic object change degree pattern $z_1$ is added in the criterion change degree pattern memory 150 in association with the event of the fault D. By so doing, if the same fault has occurred again, it may be detected not as an unknown fault, but as the fault D.

Several specified examples of the method for calculating the degree of change in the diagnostic object change degree pattern generation unit 110 will now be explained.

As an example method of calculating the degree of change, a method proposed by the Non-Patent Document 1 may be used. The change degree calculation method, proposed in Non-Patent Document 1, learns time-series data using an auto regression model. Each time the time-series data is acquired, the degree of being an outlier from the probability distribution, as calculated from the model, is calculated. The degree of being an outlier is calculated as log likelihood of data, a Hellinger score between the probability distribution as learned with the exclusion of the data and the probability distribution as learned with the inclusion of the data, or as a distance between the center of the probability distribution and the data. This degree of being an outlier may be used as the degree of change according to the present invention. In Non-Patent Document 1, time-series data of the degree of being an outlier calculated, more specifically, the moving-averaged degree of being an outlier, is learned using an auto regression model. Each time the degree of being an outlier of newly acquired data is calculated, the degree of being an outlier of the degree of being an outlier is calculated from the probability distribution of the degree of being an outlier as calculated from the above model. This degree of being an outlier of "the degree of being an outlier" may also be used as the degree of change according to the present invention. If time-series data takes on a symbol value, not the auto regression model but a Markov model or a hidden Markov model, for example, may be used to calculate the degree of being an outlier. This is based on a concept of calculating the degree of change from the degree of being an outlier from the probability distribution of the time-series model. Although the learning is endowed with the effect of forgetting the past, in Patent Document 1, there may or may not be the forgetting effect as long as the application to the degree of change of the present invention is concerned.

As another example of calculating the degree of change, the method proposed in Non-Patent Document 2 may be used. With the method for calculating the degree of change, as proposed in Non-Patent Document 2, partial time-series vectors of a fixed length are sequentially generated from the time series data. An eigenvector of a matrix, formed by a number of the partial time-series vectors, arrayed in the time domain, is then calculated. The degree of change, proposed by Non-Patent Document 2, may be defined as variations of the eigenvector temporally before and after the time point of change degree calculation.

Another method of calculating the degree of change consists in learning a statistic probability model, such as a mixed normal distribution model, from time-series data, and in using the degree of being an outlier. The degree of being an outlier may be defined by, for example, the distance between data and the center of the probability model or log likelihood of data.

A further method of calculating the degree of change consists in taking the degree of change to be unity (1) or zero (0) in case where the value of the time-series data that takes on a symbol value is or is not changed from that at a previous time point, respectively.

Figure 6:
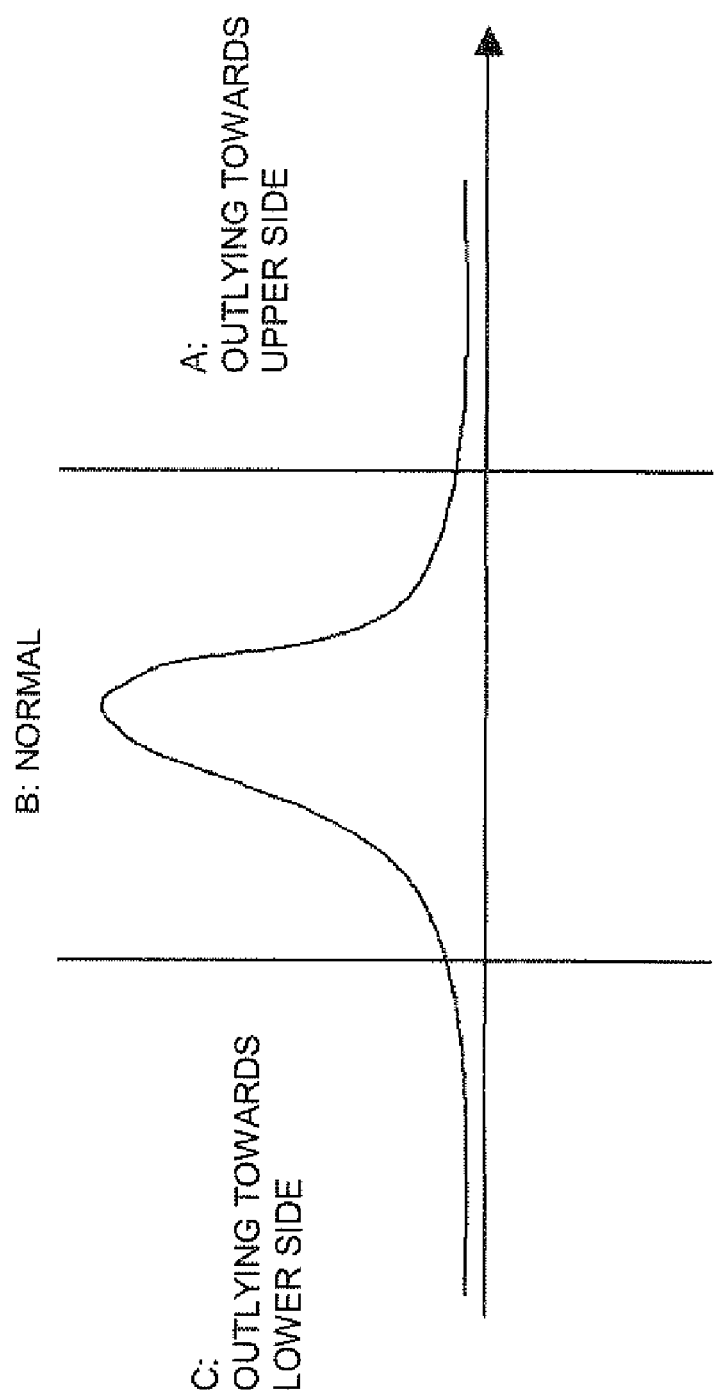
FIG. 6 is a graph showing an example of finding the degree of change.

Yet another method of calculating the degree of change consists in taking the degree of change to be A, B or C for an area offset from an average value in an increasing direction, an area including the average value and for an area offset from the average value in a decreasing direction, respectively, as shown in FIG. 6. In this case, the degree of change is defined by symbolic values of A, B and C.

The meritorious effect of the present invention may be summarized as follows:

With the present exemplary embodiment, detection of a fault and estimation of its cause may be accomplished by the same sequence of operations based on the degree of change of each of a plurality of attributes in a data as measured from the object being diagnosed.

With the present exemplary embodiment, meaningful diagnosis may be given even in case only a small number of criterion change degree patterns regarding the same fault may be obtained in past instances.

[Second Exemplary Embodiment]

Figure 7:
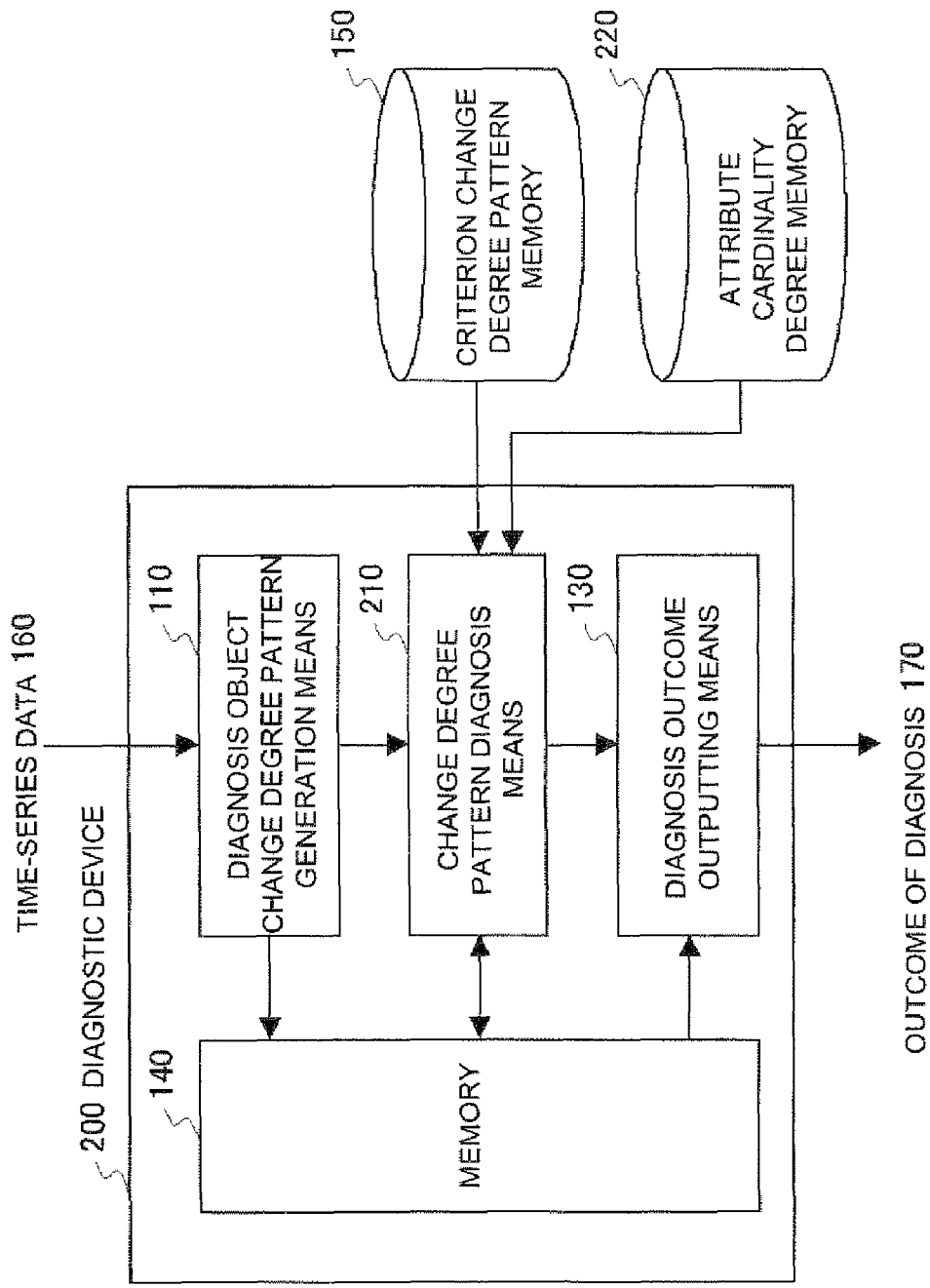
FIG. 7 is a block diagram showing a diagnostic device according to a second exemplary embodiment of the present invention.

Referring to FIG. 7, a diagnostic device 200 of a second exemplary embodiment of the present invention differs from the diagnostic device 100 of the first exemplary embodiment shown in FIG. 1 as to a change degree pattern diagnosis unit 210 provided in place of the change degree pattern diagnosis unit 120, and as to an attribute cardinality degree memory 220 connected to the device.

Referring to FIG. 8, the degree of cardinality of each attribute in the diagnosis of an event-to-be-diagnosed is stored in the attribute cardinality degree memory 220 in association with the event. In the example of FIG. 8, the degree of cardinality $w_{11}$ of an attribute 1, the degree of cardinality $w_{12}$ of an attribute 2, ..., the degree of cardinality $w_{1m}$ of an attribute m are held in store. The degree of cardinality may be discrete values, such as a value 1 indicating cardinality or a value of 0, indicating non-cardinality, or a real number value specifying the degree of cardinality in more detail.

The change degree pattern diagnosis unit 210 compares a diagnostic object change degree pattern, generated by the diagnostic object change degree pattern generation unit 110, to the criterion change degree patterns stored in the criterion change degree pattern memory 150. In this case, the change degree pattern diagnosis unit reads out the degree of cardinality of each attribute of the criterion change degree pattern in question, associated with the event-to-be-diagnosed, from the criterion change degree pattern memory 150. The change degree pattern diagnosis means compares the two patterns to each other in consideration of the degree of cardinality of each attribute. Specifically, the change degree pattern diagnosis unit is able to calculate the degree of similarity between the diagnostic object change degree pattern and the criterion change degree pattern, using the following equation for calculation (2) modified from equation (1):

$$d(z,y) = \sum_{i=1}^{m} w_i (z_i - y_i)^2 \qquad (2)$$

where $w_i$ is the degree of cardinality of the attribute i. Of course, the degree of similarity between the patterns is not limited to that defined by equation (2), such that a value derived by preset calculations from the degree of similarity calculated by equation (2) may also be defined as the degree of similarity.

An example operation of the diagnostic device 200 in its entirety, according to the present exemplary embodiment, is now explained in detail.

With the exclusion of the processing of the step S103 of FIG. 3, the operation of the diagnostic device 200 of the present exemplary embodiment is wholly the same as that of the diagnostic device 100 of the first exemplary embodiment shown in FIG. 1. With the present exemplary embodiment, the following processing is executed at the step S103.

The change degree pattern diagnosis unit 210 reads out the diagnostic object change degree pattern $z_1$, generated by the diagnostic object change degree pattern generation means 110, from the memory 140. The change degree pattern diagnosis unit then calculates the degree of similarity of the so read out pattern to each criterion change degree pattern stored in the criterion change degree pattern memory 150. At this time, the change degree pattern diagnosis unit reads out the degree of cardinality of each attribute, associated with the event of the criterion change degree pattern, being compared to the diagnostic object change degree pattern, from the attribute cardinality degree memory 220. The change degree pattern diagnosis unit then calculates the degree of similarity, using the above equation (2). For example, if the criterion change degree patterns $y_1$, $y_2$ and $y_3$, shown in FIG. 2, are stored in the criterion change degree pattern memory 150, the degree of cardinality of each attribute is stored in the attribute cardinality degree memory 220 in association with the events of the criterion change degree patterns $y_1$, $y_2$ and $y_3$. It is now assumed that an event, that is, the fault A of the criterion change degree pattern $y_1$, is an event 1 of FIG. 8. In calculating the distance between the diagnostic object change degree pattern $z_1$ and the criterion change degree pattern $y_1$, $w_{11}$ to $w_{1m}$ are read out as the degree of cardinality of each attribute from the attribute cardinality degree memory 220. Then, using the above equation (2), the degree of similarity between the diagnostic object change degree pattern $z_1$ and the criterion change degree pattern $y_1$ is calculated.

The meritorious effect of the present exemplary embodiment is now described.

With the present exemplary embodiment, the meritorious effect similar to that of the first exemplary embodiment may similarly be obtained. In addition, the diagnosis may be higher in accuracy, by the following reason:

In case the object being diagnosed is a small-sized system in which the total of the attributes included in the time-series data 160 influences the diagnosis, there is presented no problem by impartially comparing the diagnostic object change degree pattern to the criterion change degree pattern for the total of the attributes. However, if the object being diagnosed is a complex device or system, the time series data 160 prepared from it includes larger numbers of attributes. There may be totally irrelevant attributes, depending on the sorts of the events. Hence, if the diagnostic object change degree pattern and the criterion change degree pattern are impartially compared to one another, it is highly likely that those irrelevant attributes influence the diagnosis, thus possibly leading to misdiagnosis.

It is now assumed that the number of attributes m is 6 and that a pattern $y_1$ [1, 0, 1, 1, 0, 1] is used as a criterion change degree pattern having the fault A as an event. This is based on a past instance indicating that the fault A occurred for such pattern. It is also assumed that, by later instances or by analysis by an expert, it has been shown that the first, second and sixth attributes are irrelevant to the fault and that values of the degree of change of the third to fifth attributes being 1, 1, 0 represents a true characterizing portion. If, in this case, the total of the attributes are compared impartially, the diagnostic object change degree pattern $z_1$ of [0, 1, 0. 0, 1, 0] and the diagnostic object change degree pattern $z_2$ of [1, 0, 1, 1, 0, 1] both have the same degree of similarity with respect to the criterion change degree pattern in question, and hence cannot be discriminated from each other, thus causing misdetection or failed detection. If conversely the attribute cardinality degree of [0, 0, 1, 1, 1, 0] is set in association with the event of the fault A, the degree of similarity between the criterion change degree pattern $y_1$ and the diagnostic object change degree pattern $z_1$ is 6, whereas that between the diagnostic object change degree pattern $z_2$ and the criterion change degree pattern $y_2$ is 0, thus preventing misdiagnosis.

[Third Exemplary Embodiment]

Figure 9:
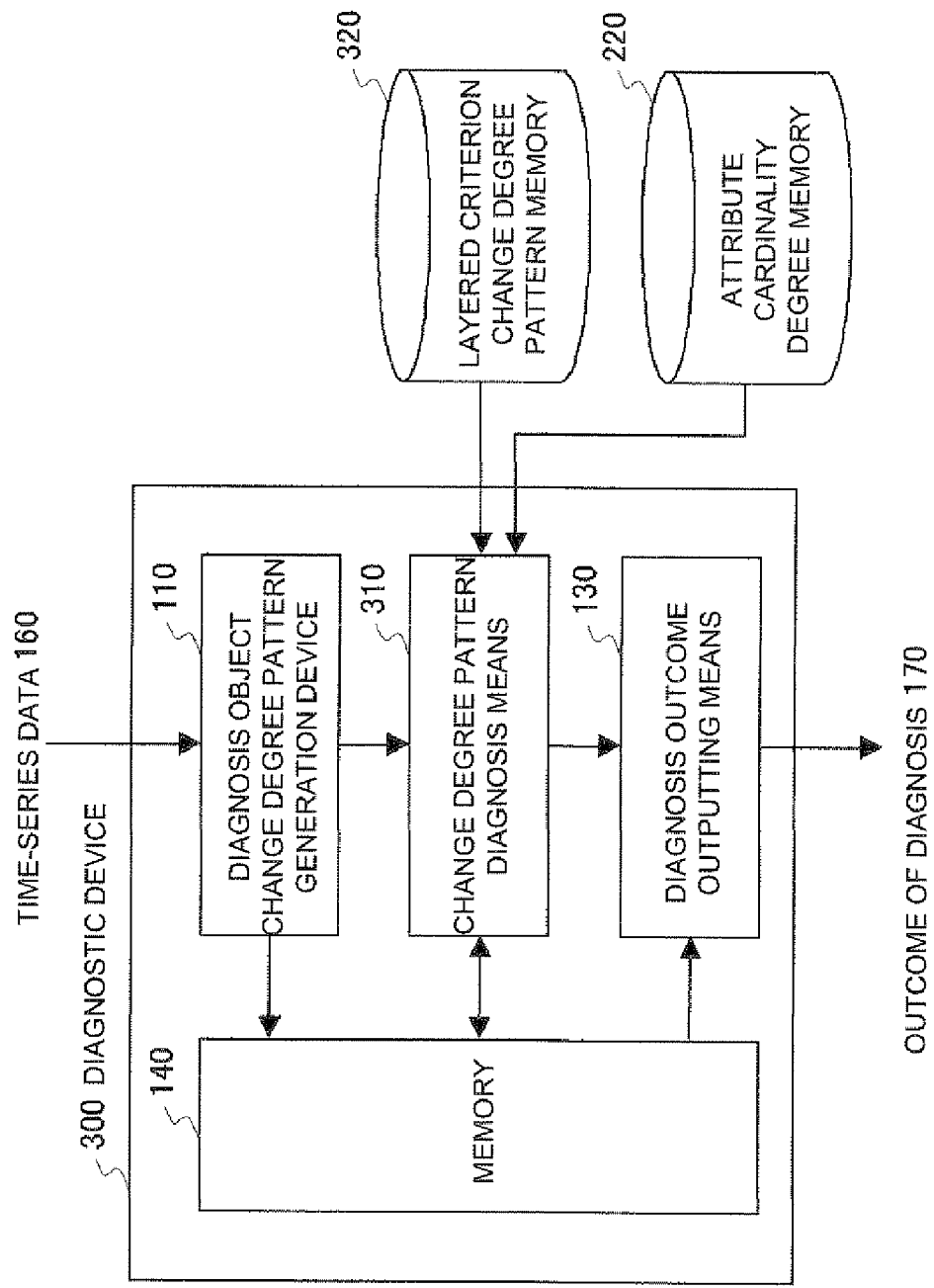
FIG. 9 is a block diagram showing a diagnostic device according to a third exemplary embodiment of the present invention.

Referring to FIG. 9, there is shown a diagnostic device 300 according to a third exemplary embodiment of the present invention. This diagnostic device differs from the diagnostic device 200 of the second exemplary embodiment shown in FIG. 7 in including a change degree pattern diagnosis unit 310 in place of the change degree pattern diagnosis unit 210 and in including a layered criterion change degree pattern memory 320 in place of the criterion change degree pattern memory 150.

Data of a layered structure of a plurality of events as the subjects for diagnosis and a plurality of layer-based criterion change degree patterns are stored in the layered criterion change degree pattern memory 320. An example of such data is shown in FIG. 10. In this example, the data is in two layers, namely a first layer that detects a fault and a second layer that estimates the cause of the fault detected. The layered criterion change degree pattern memory holds in store one or more criterion change degree patterns used for detecting a fault, as a first set of layered patterns, and one or more criterion change degree patterns used for estimating its cause, as a second set of layered patterns. The three criterion change degree patterns $y_1$, $y_2$ and $y_3$, included in the first layered pattern set, are the same as those shown in FIG. 2, while the seven criterion change degree patterns $y_{11}$, $y_{12}$, $y_{13}$, $y_{14}$, $y_{15}$, $y_{16}$, $y_{17}$, included in the second layered pattern set, are the same as those shown in FIG. 4.

FIG. 10 shows that the first layered structure detects faults A, B and C, in the first layer, and that criterion change degree patterns of pattern numbers 1 to 3 are used to detect the faults A, B and C, respectively. FIG. 10 also shows that the causes of the faults A, B and C are estimated in the second layer, and that criterion change degree patterns with the pattern numbers 11 and 12, those with the pattern numbers 13 and 14 and those with the pattern numbers 15 to 17 are used to estimate the causes A, B and C, respectively.

In the attribute cardinality degree memory 220, there are stored the values of the degree of cardinality of respective attributes, in the diagnosis of respective events, in association with the sorts of events of respective criterion change degree patterns stored in the layered criterion change degree pattern memory 320, as shown in FIG. 11. It is noted that, for the attributes with the higher degree of cardinality in the criterion change degree patterns used for fault detection, the degree of cardinality is similarly set in general to higher values in the criterion change degree patterns used for estimating the causes of the detected fault. In the multiple criterion change degree patterns used for estimating the cause of the fault detected, there are one or more attributes of differing values as a result of the difference in the causes. These attributes of the differing values are set to higher values of the degree of cardinality, as will now be explained by taking a simple example.

It is now assumed that the number of attributes is 6. It is also assumed that, in a certain instance, the change degree pattern y1 [1,0,1,1,0,1] was observed when the fault A occurred due to the cause a1, and that, in another instance, the change degree pattern [0,0,1,1,0,1] was observed when the fault A occurred due to the cause a2. It is further assumed that analyses by expert revealed that the second and sixth attributes are irrelevant to the fault A and that the first attribute characterizes the difference between the causes a1 and a2. In this case, the change degree pattern y1 is used as the criterion change degree pattern associated with the event of the fault A by the cause a1. As the corresponding attribute cardinality degree, only the first and third to fifth attributes are set high. The change degree pattern y2 is used as the criterion change degree pattern associated with the event of the fault A by the cause a2. As the corresponding attribute cardinality degree, only the first and third to fifth attributes are set high. As the criterion change degree pattern corresponding to the event of the fault A, the change degree pattern y1 or the change degree pattern y2 is used. As the attribute cardinality degree, associated therewith, only the third to fifth attributes are set high.

A global example operation of the diagnostic device 300 of the present exemplary embodiment is explained in detail.

Figure 12:
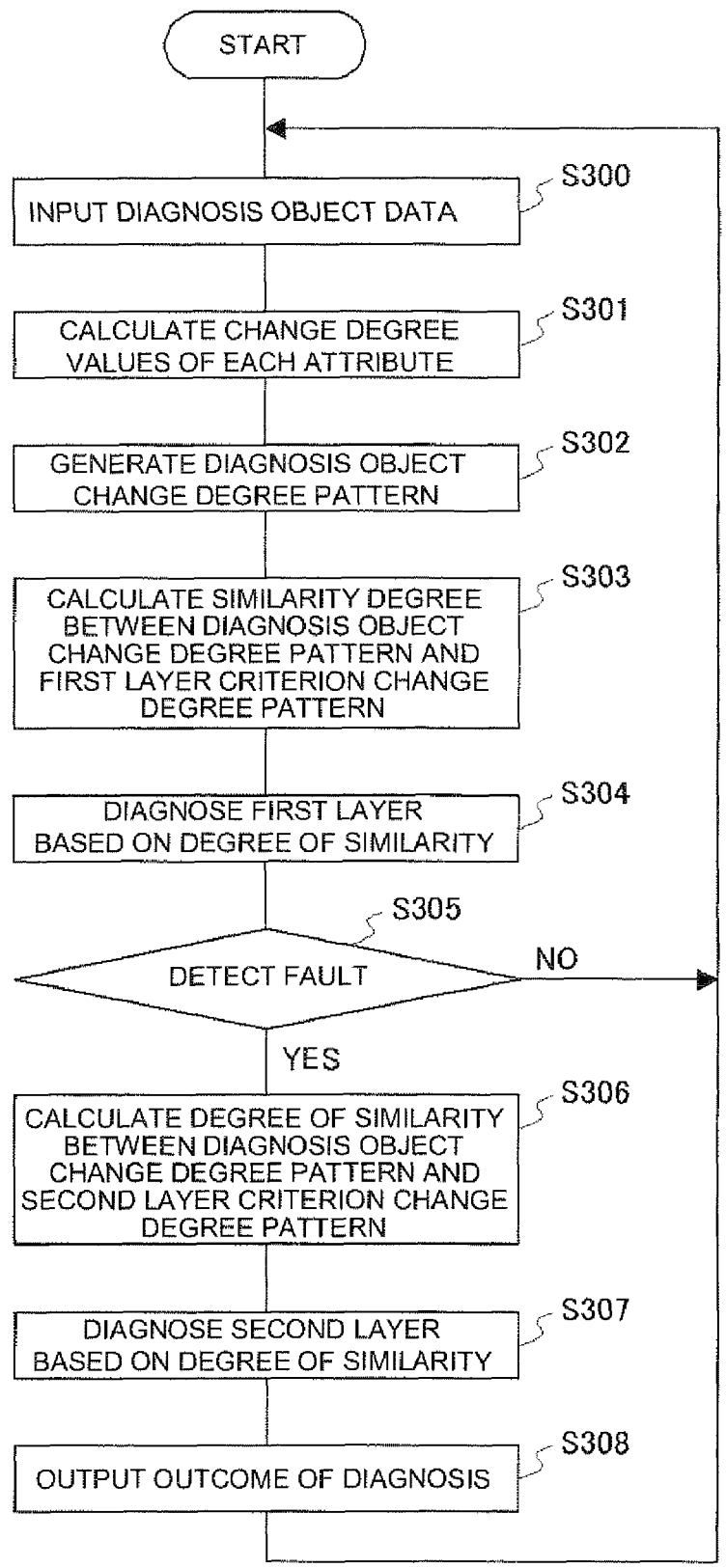
FIG. 12 is a flowchart showing an example of processing by the diagnostic device of the third exemplary embodiment of the present invention.

Referring to FIG. 12, the diagnostic object change degree pattern generation unit 110 of the diagnostic device 300 inputs (receives) time-series data 160, including an m-number of attributes, measured at time t1 from the object being diagnosed, as subject data for diagnosis (S300). The diagnostic object change degree pattern generation unit 110 calculates the change degree for each of the attributes included in the time-series data 160 (S301). The diagnostic object change degree pattern generation unit then generates a pattern of the combination of values of the change degree of the respective attributes $(z_1^1, z_1^2, \ldots, z_1^m)$, as a diagnostic object change degree pattern $z_1$, and records the so generated diagnostic object change degree pattern in the memory 140 (S302). The operation up to this stage is the same as that of the first and second exemplary embodiments.

The change degree pattern diagnosis unit 310 reads out the diagnostic object change degree pattern $z_1$, generated by the diagnostic object change degree pattern generation unit 110, from the memory 140. The change degree pattern diagnosis unit then calculates the values of the degree of similarity $d(z_1, y_1)$, $d(z_1, y_2)$ and $d(z_1, y_3)$ of the so read out diagnostic object change degree pattern to the criterion change degree patterns $y_1$, $y_2$ and $y_3$ of the first layer as specified by the data of the layered structure stored in the criterion change degree pattern memory 150 (S304). At this time, the values of the degree of cardinality of the respective attributes associated with the events of the criterion change degree patterns $y_1$, $y_2$ and $y_3$ to be compared to the diagnostic object change degree pattern are read out from the attribute cardinality degree memory 220. The degree of similarity is then calculated using the above equation (2).

Then, as in the first and second exemplary embodiments, the change degree pattern diagnosis unit 310 detects a fault based on the calculated values of the degree of similarity $d(z_1, y_1)$, $d(z_1, y_2)$ and $d(z_1, y_3)$ (S305). For example, if all of the three values of the degree of similarity $d(z_1, y_1)$, $d(z_1, y_2)$ and $d(z_1, y_3)$ are larger than the threshold value dst, a diagnosis is made to the effect that no fault has occurred. Processing then reverts to the step S300. If only the value of the degree of similarity $d(z1, y1)$ is smaller than the threshold value dst, a diagnosis is made to the effect that the fault A has occurred.

If the change degree pattern diagnosis unit 310 has detected a fault, the change degree pattern diagnosis unit reads out the criterion change degree pattern of the second layer from the criterion change degree pattern memory 150. The change degree pattern diagnosis unit calculates the degree of similarity of the so read out pattern to the diagnostic object change degree pattern $z_1$ (S306). For example, if the fault A has been detected, the change degree pattern diagnosis unit reads out the criterion change degree patterns $y_{11}$, $y_{12}$ to estimate the cause of the fault A, in accordance with the data of the layered structure, to calculate the degree of similarity $d(z_1, y_{11})$, $d(z_1, y_{12})$ of the so read out patterns to the diagnostic object change degree pattern $z_1$. At this time, the change degree pattern diagnosis unit reads out the degree of cardinality of respective attributes associated with the events of the criterion change degree patterns $y_{11}$, $y_{12}$, being compared, from the attribute cardinality degree memory 220, to calculate the degree of similarity using the equation (2).

The change degree pattern diagnosis unit 310 then records the result of ranking of the causes of the fault, based on the relative magnitudes of the degree of similarity, as the outcome of the diagnosis in the memory 140 (S307). For example, if $d(z1, y11)<d(z1, y12)$, the outcome of diagnosis is generated stating that the first candidate is the fault A ascribable to the cause a1 and the second candidate is the fault A ascribable to the cause a2.

The diagnosis outcome outputting means 130 reads out the outcome of the diagnosis of the change degree pattern diagnosis unit 310 from the memory 140 to output the so read out diagnosis outcome (S308).

When the processing for diagnosis for the time-series data 160, including the m-number of attributes as measured from the object for diagnosis at time t1, has come to a close, the diagnostic device 300 reverts to the step S300. The diagnostic device reiterates the processing for the time-series data 160 measured at the next time point.

In the above Example, the event-to-be-diagnosed is in two layers, namely the layer of fault detection and the layer of estimation of the cause of the fault. Or, the event may be in three layers, namely the first layer of detection of a fault that has occurred, the second layer of detection of the site of occurrence, and the third layer of estimation of the reason the fault has occurred in the site. Extension to four or more layers is also possible.

The meritorious effect of the present exemplary embodiment is now described.

According to the present exemplary embodiment, not only the meritorious effect similar to that of the second exemplary embodiment, but also the meritorious effect that diagnosis of higher accuracy may be made with higher efficiency, may be obtained. The reason may be summarized as follows: The criterion change degree pattern of each layer is stored in accordance with the layered structure of the event-to-be-diagnosed. The change degree pattern diagnosis unit 310 begins with the diagnosis of fault detection employing the criterion change degree pattern belonging to the upper layer. On fault detection, the change degree pattern diagnosis unit proceeds to the diagnosis of the cause of the fault, using the criterion change degree pattern belonging to the lower layer. This results in reducing the number of criterion change degree patterns uselessly compared. For example, if the criterion change degree pattern, shown in FIG. 4, is used, the diagnostic device 100 of the first exemplary embodiment is able to make diagnosis up to the stage of estimating the cause of the faults A to C. It is however necessary to evaluate the seven criterion degree patterns of y11 to y17 each time. Conversely, with the present exemplary embodiment, the three criterion change degree patterns $y_1$ to $y_3$ need to be evaluated each time. If no fault is detected, other criterion change patterns do not have to be evaluated. Moreover, if a fault is detected, it is sufficient to evaluate the criterion change degree patterns of the second layer to estimate the cause of the fault detected. For example, in the case of the fault A, it is sufficient to evaluate only five criterion change degree patterns of $y_1$ to $y_3$, $y_{11}$ and $y_{12}$, inclusive of those for estimating the cause of the fault.

[Modification of the Third Exemplary Embodiment]

With the third exemplary embodiment, the degree of cardinality of the attribute is exploited. In the present modification, diagnosis is made in a stratified manner (or hierarchically) without exploiting the cardinality degree of attributes. In the present modification, the attribute cardinality degree memory 220 of FIG. 9 is omitted. Moreover, as a criterion change degree pattern of the first layer pattern set, to be stored in the layered criterion change degree pattern memory 320, shown in FIG. 10, an expected value, such as an average value, of a plurality of criterion change degree patterns of the second layer pattern set, regarding the same fault, is set. For example, an expected value of two criterion change degree patterns of the second layer, bearing pattern numbers 11 and 12, is set as the criterion change degree pattern of the pattern number 1 of the first layer.

The operation of the present modification is wholly the same as that of the third exemplary embodiment, except not using the degree of cardinality of the attributes.

A criterion change degree pattern generation device that generates a criterion change degree pattern, used in the diagnostic device of the above-described diagnostic device, is now explained.

Figure 13:
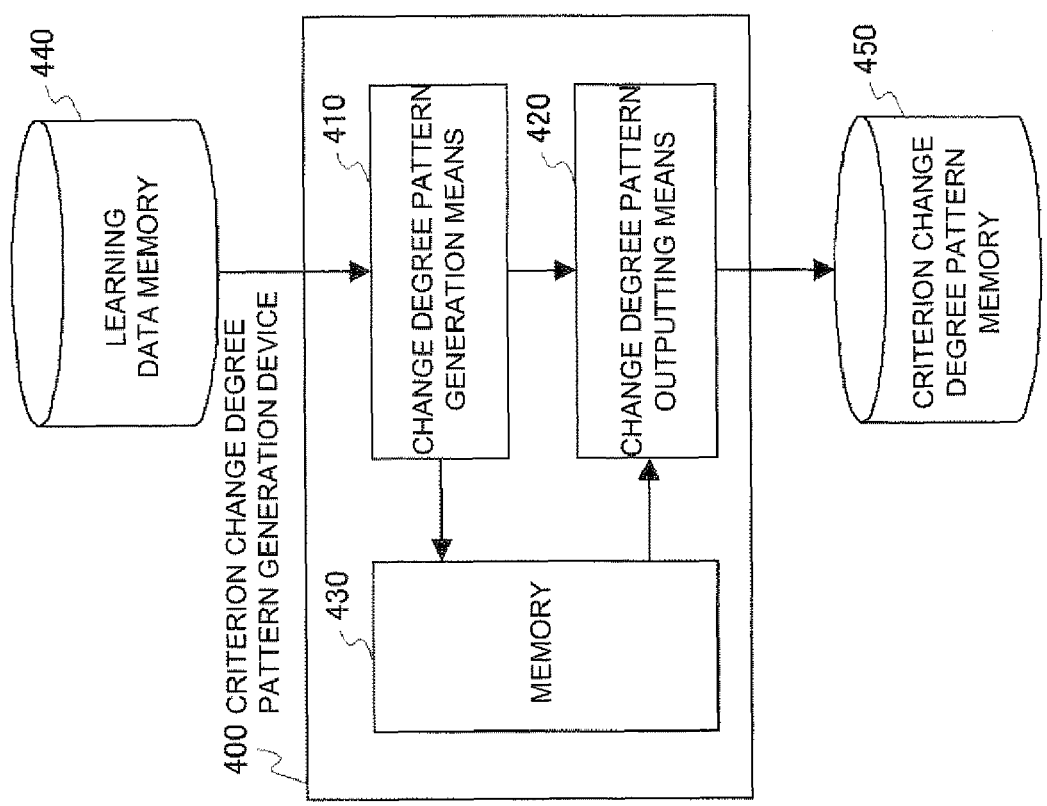
FIG. 13 is a block diagram showing a criterion change degree pattern generation device.

Referring to FIG. 13, a criterion change degree pattern generation device 400 includes a change degree pattern generation unit 410, a change degree pattern outputting unit 420 and a memory 430. A learning data memory 440 and a criterion change degree pattern memory 450 are attached to the criterion change degree pattern generation device 400. The criterion change degree pattern generation device inputs learning data from the learning data memory 440 and generates the criterion change degree patterns from the input learning data to record the so generated criterion change degree patterns in the criterion change degree pattern memory 450.

In the learning data memory 440, time-series data $u_j$, measured from the object being diagnosed, are stored correlated with events. FIG. 14 shows an instance of such data storage. Data numbers uniquely identify respective time-series data and are arranged in a time sequence of the time series data. The operating conditions of the object being diagnosed, which prevailed when the time-series data were obtained from the object being diagnosed, are set as events associated with the respective time series data. For example, the event set for the time-series data $u_{11}$ of the data number 11 indicates that the fault A by the cause a1 occurred at a time point the time-series data $u_{11}$ was obtained from the object being diagnosed. The event set for the time-series data $u_1$ or $u_2$ of the data number 1 or 2 indicates that no fault occurred at the time points the time-series data $u_1$ or $u_2$ was obtained, with the object being diagnosed being in normal states. Thus, the events for the respective time-series data are determined based on, for example, the results of analysis of past hysteresis of faults of the object being diagnosed, the results of experiments on actual devices or those by a simulator, for instance.

The change degree pattern generation unit 410 sequentially reads out time-series data from the learning data memory 440. The change degree pattern generation unit then calculates the degree of change with lapse of time of the values of the attributes included in each time-series data, from one time-series data to another. This calculation is made in accordance with a method similar to that used in the diagnostic object change degree pattern generation unit 110 of the diagnostic device described above. The change degree pattern generation unit then generates a pattern of a combination of change degree values of the respective attributes as criterion change degree patterns associated with the time-series data in question. The change degree pattern generation unit then records the criterion change degree pattern as a set with the event as set for the time-series data in question.

The change degree pattern outputting unit 420 reads out sets of the criterion change degree patterns and the events, generated by the change degree pattern generation unit 410, from the memory 430, to record the so read out sets in the criterion change degree pattern memory 450. It is not mandatory to read out the total of the criterion change degree patterns recorded in the memory 430, such that it is sufficient to selectively read out only the criterion change degree patterns associated with the event related with the fault and to record the so read out criterion change degree patterns in the criterion change degree pattern memory 450. It is noted that the criterion change degree pattern memory 450 may be the same as or different from the criterion change degree pattern memory 150 or 320 of the diagnostic devices described above.

The global operation of the criterion change degree pattern generation device 400 is now described.

Figure 15:
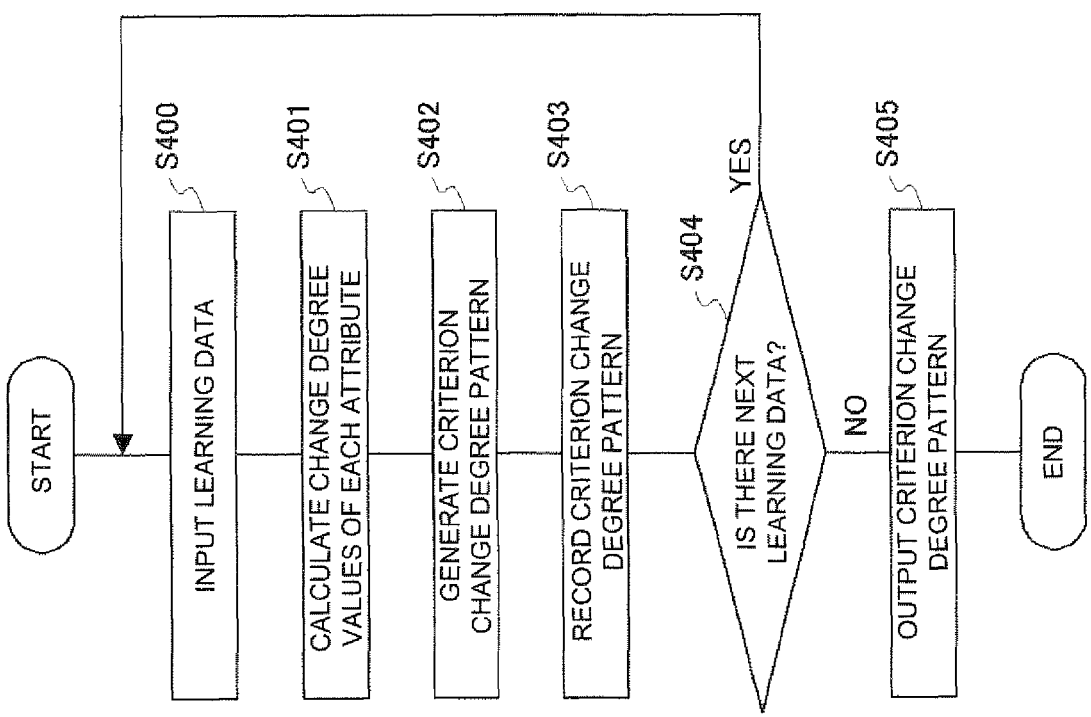
FIG. 15 is a flowchart showing an example processing by the criterion change degree pattern generation device.

Referring to FIG. 15, a set of the leading time-series data and events are read out by the change degree pattern generation means 410 of the criterion change degree pattern generation device 400 from the learning data memory 440 as learning data (S400). The change degree pattern generation unit then calculates the change degree value for each attribute included in the time-series data (S401). The change degree pattern generation unit then generates, as a sole criterion change degree pattern, a pattern consisting in a combination of the values of the change degree of respective attributes (S402). The change degree pattern generation unit then records the so generated criterion change degree pattern as a set with the event associated therewith (S403). The same processing is repeated for the remaining data recorded in the learning data memory 440. When the processing for the total of the data has come to a close (NO in the step S404), the set of the criterion change degree pattern and the event, recorded in the memory 430, is output to the criterion change degree pattern memory 450 (S405) to terminate the processing.

As a result of the above processing, the criterion change degree pattern associated with the event indicative of the occurrence of the fault A due to the cause a1, as indicated by the pattern number 11 of FIG. 4, may be generated based on the time-series data $u_{11}$ of the data number 11 of FIG. 14, for instance. The criterion change degree pattern associated with the event indicative of the occurrence of the fault A due to the cause a2, as indicated by the pattern number 12 of FIG. 4, may be generated based on the time-series data $u_{21}$ of the data number 21 of FIG. 14, for instance. The criterion change degree pattern associated with an event for a normal operating condition, indicated by, for example, the pattern number 21 of FIG. 5, may, for example, be generated based on the time-series data $u_1$ of the data number 1 of FIG. 14.

An attribute cardinality degree generation device for generating the attribute cardinality degree used in the diagnostic device of the above-described exemplary embodiment is now described.

Figure 16:
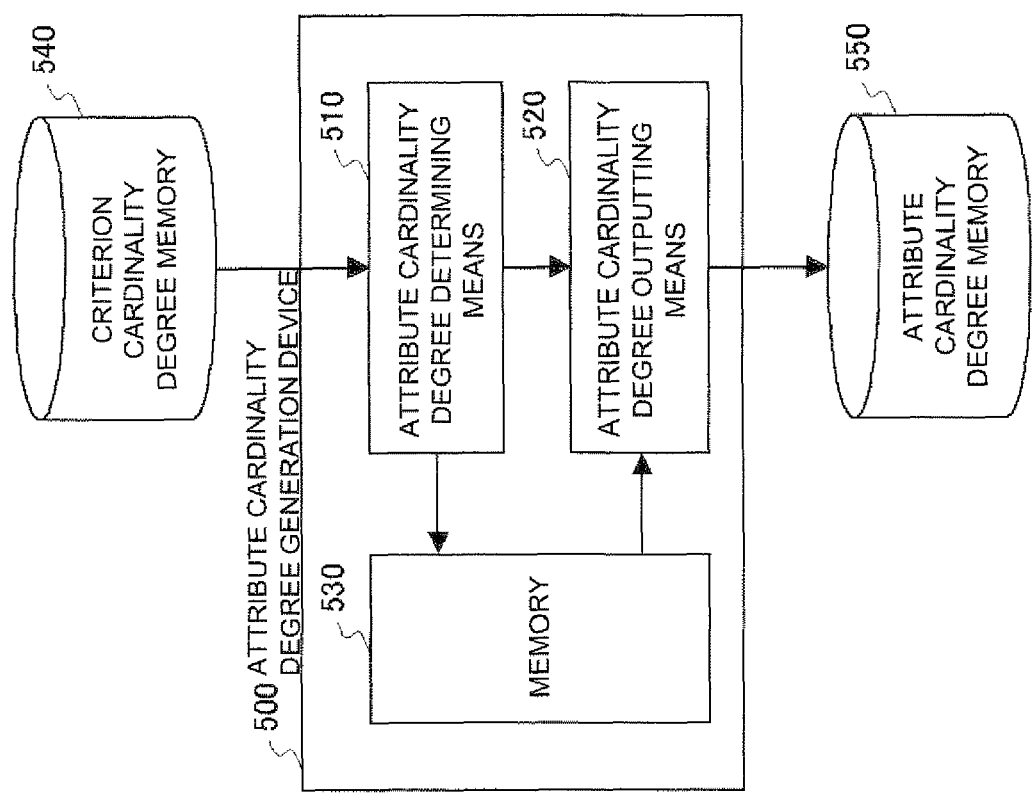
FIG. 16 is a block diagram showing an example of an attribute cardinality degree generation device.

Referring to FIG. 16, an attribute cardinality degree generation device 500 includes an attribute cardinality degree determining unit 510, an attribute cardinality degree outputting means 520 and a memory 530. A criterion change degree pattern memory 540 and an attribute cardinality degree memory 550 are attached to the attribute cardinality degree generation device 500. The attribute cardinality degree generation device inputs a set of a criterion change degree pattern from the criterion change degree pattern memory 540, and an event associated therewith. The attribute cardinality degree generation device then determines the degree of cardinality of each attribute in the criterion change degree pattern used in detecting the occurrence of a fault or estimating its cause, and records the so determined degree of cardinality in the attribute cardinality degree memory 550.

The criterion change degree pattern memory 540 has stored therein a criterion change degree pattern associated with a fault-related event shown in FIGS. 2, 4 and 5, and a criterion change degree pattern associated with a normal state event shown in FIG. 5. The criterion change degree pattern memory 540 may be the same as or different from the criterion change degree pattern memory 450 of FIG. 13.

Using a predetermined evaluation function, the attribute cardinality degree determining unit 510 determines, for each sort of the fault-related events, the degree of cardinality of teach attribute of the criterion change degree pattern belonging to a given one of the events, and records the so determined degree of cardinality in the memory 530.

The attribute cardinality degree outputting unit 520 reads out the degree of cardinality of each attribute of each event, determined by the attribute cardinality degree determining unit 510, from the memory 530, to record the so read out cardinality degree in the attribute cardinality degree memory 550. It is noted that the attribute cardinality degree memory 550 may be the same as or different from the attribute cardinality degree memory 220 of the diagnostic device 200.

The global operation of the attribute cardinality degree generation device 500 is now described.

Figure 17:
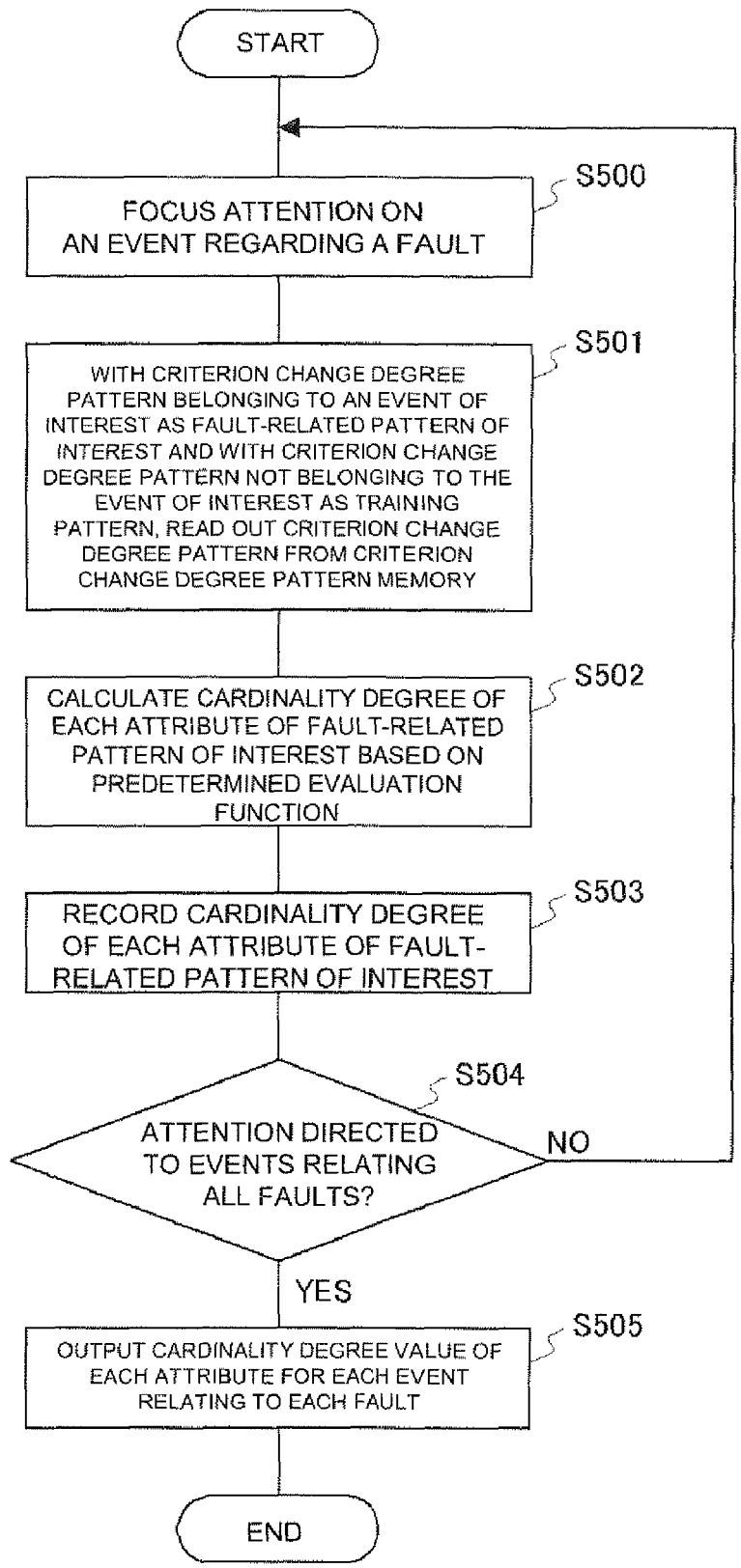
FIG. 17 is a flowchart showing an example of processing by the attribute cardinality degree generation device.

Referring to FIG. 17, the attribute cardinality degree determining unit 510 of the attribute cardinality degree generation device 500 directs its attention to a fault-related event stored in the criterion change degree pattern memory 540 (S500). The criterion change degree pattern belonging to the event of interest, as a fault-related pattern of interest, and the criterion change degree pattern not belonging to the event of interest, as a training pattern, are read out from the criterion change degree pattern memory 540 (S501). The attribute cardinality degree determining unit 510 then calculates the degree of cardinality of each attribute of the fault-related pattern of interest, based on the predetermined evaluation function (S502), to record the result of the calculations in the memory 530 (S503). The same processing is reiterated for other fault-related events stored in the criterion change degree pattern memory 540. When the processing for the total of the events has been finished (YES of step S504), the attribute cardinality degree outputting unit 520 outputs the degree of cardinality of each attribute, related with each fault recorded in the memory 530, on the event-by-event basis, to the attribute cardinality degree memory 550 (S505). Processing then comes to a close.

The processing carried out in the step S502 is now described in detail.

To decide on the degree of cardinality of an attribute, the attribute cardinality degree determining unit 510 uses an evaluation function shown by the following equation (3):

$$J=f(J_1,J_2,J_3,J_4,) \quad (3)$$

where f is a function for optional combinations of $J_1$, $J_2$, $J_3$, $J_4$. It is noted that $J_1$, $J_2$, $J_3$ and $J_4$ are the following evaluation functions:

The evaluation function $J_1$ expresses the effect of determining the degree of cardinality of respective attributes of the fault-related patterns of interest so that the fault-related patterns of interest will not be similar to the training patterns on the whole.

The evaluation function $J_2$ expresses the effect of determining the degree of cardinality of respective attributes of the fault-related patterns of interest so that the fault-related patterns of interest will not be similar to those training patterns that are similar to the fault-related patterns of interest.

The evaluation function $J_3$ expresses the effect of determining the degree of cardinality of respective attributes of the fault-related patterns of interest so that the fault-related patterns of interest will be similar to one another.

The evaluation function $J_4$ is another optional evaluation function adequate for characterizing the fault-related patterns of interest, such as a term for regularization.

The evaluation function J may be endowed with the effect of selecting the fault-related pattern of interest and those training patterns that are similar to the fault-related pattern of interest. In this case, the evaluation function J is an evaluation function for determining the cardinality degree of each attribute adequate for characterizing the fault-related pattern of interest, while being an evaluation function for selecting a pattern among the training patterns that is similar to the fault-related pattern of interest.

As the degree of similarity among patterns, not only the degree of similarity defined in the aforementioned equation (2), but also that added by a constant $b_i$ defined by the following equation (4):

$$d(z_{11},z_{12})=\sum_{i=1}^{m} w_i b_i (z_{11}^i - z_{12}^i)^2 \quad (4)$$

may be used. In the above equation, $z_{11}$, $z_{12}$ is a training pattern or a fault-related pattern of interest used for finding the degree of similarity.

More specifically, the evaluation function J may be formulated as shown for example by the following expressions (5) or (6):

$$J(w, \alpha) = \qquad (5)$$

$$\sum_{i=1}^{m} w_i(\underline{y}^i - E[x^i]^2) + \sum_{i=1}^{m} w_i \sum_{t=1}^{N} \alpha_t(|x_t^i - \underline{y}^i| - |E[|x^i - \underline{y}^i|])^2 -$$

$$\sum_{i=1}^{m} w_i \sum_{j,k}^{M} (1/M^2)(y_j^i - y_k^i)^2 - \gamma \sum |w_i| - \eta \sum |\alpha_t|$$

$$J(w, \alpha) = \sum_{i=1}^{m} \sum_{ty=1}^{M} \sum_{tx=1}^{N} (1/NM) w_i (y_{ty}^i - x_{tx}^i)^2 + \qquad (6)$$

$$\sum_{i=1}^{m} w_i \sum_{t=1}^{N} \alpha_t(|x_t^i - \underline{y}^i| - |E[|x^i - \underline{y}^i|])^2 -$$

$$\sum_{i=1}^{m} w_i \sum_{j,k}^{M} (1/M^2)(y_j^i - y_k^i)^2$$

$$= \gamma \sum |w_i| - \eta \sum |\alpha_t|$$

In the above equations, y denotes the fault-related patterns of interest, M denotes the number of the fault-related patterns of interest and $\underline{y}^i$ denotes an expected value of the i'th attributes, for example, a simplistic or weighted average of the M-number of the fault-related patterns of interest. Also, x denotes training patterns, M the number of the training patterns. E[ ] denotes an expected value, such as an average value, of the values within the bracket [ ] and $\gamma$, $\eta$ denote proper parameters. Further, $w_i$ denotes the degree of cardinality of i'th attribute of the fault-related pattern of interest. The larger the value of $w_i$, the more cardinal is the attribute in question. $\alpha_t$ denotes the degree of cardinality of a t'th training pattern used for selecting a fault-related pattern of interest and the one of the training patterns that is similar to the fault-related pattern of interest. The larger the value of $\alpha_t$, the higher is the degree of cardinality. In this case, the problem of optimization of the equations (5) and (6) may be captured as the problem of maximizing $w_i$ and $\alpha_t$.

As regards the equations (5) and (6), the following is to be remarked. The first term of the right side of each of the equations corresponds to the evaluation function $J_1$. In general, the time during which a change is not taking place is longer than a time instant the change is taking place. Thus, many $x^i$'s are close to zero. As a result, the attribute being changed at the time of fault occurrence becomes higher in the cardinality degree.

The second terms of the right sides of the equations (5) and (6) correspond to the evaluation function $J_2$. If maximization with respect to $\alpha$ is considered, the majority of points remain unchanged, and hence the expected value $E|x^i-y^i|$ of the attribute changing at the time of the fault is larger. However, in analogous events, $|x_t^i-y^i|$ is small, and hence $(|x_t^i-y^i|-E[|x^i-y^i|])^2$ becomes larger, thus showing that the attribute in question is deemed to be highly cardinal. As regards w, $E[|x^i-y^i|]$ is small for an attribute unchanged with a fault-related pattern for a point of larger $\alpha$. However, if an attribute is changing for analogous events, $|x_t^i-y^i|$ becomes larger. The weight of the attribute that is not changed with respect to a fault-related pattern but is changed with an analogous pattern thus becomes larger.

The third terms of the right sides of the equations (5) and (6) correspond to the evaluation function $J_3$. In case there are a plurality of fault-related patterns as regards an event related with the same fault, penalty may be imposed on an attribute for which the distance between those patterns becomes larger. This allows the noise to be removed.

The fourth and fifth terms of the right sides of the equations (5) and (6) correspond to the evaluation function $J_4$, and operate as regularization for $w_i$ and $\alpha_t$.

In this case, $\alpha$ and $\eta$ are parameters that stand for intensity of regularization.

In the case of the equations (5) and (6), a continuous real value is used as the degree of cardinality $w_i$ of an attribute. However, the degree of cardinality may also be a discrete value or a symbolic value. In case the degree of cardinality is 1 or 0 such that there is no alternative but attribute selection and attribute non-selection, it is possible to evaluate the evaluation function J of the equation (4) by, for example, the combination(s) of attributes.

Also, in optimizing the evaluation function of the equation (4), it is possible to impose proper constraint conditions regarding the optimization. For example, in consideration that, to maximize the evaluation functions of (5) and (6), w and $\alpha$ represent the degree of cardinality of the attribute and that of the pattern, respectively, the constraint shown for example, by the equation (7):

$$\Sigma_i(w_i)^2=1, w_i\geq 0, \Sigma_i(\alpha_i)^2=1, \alpha_i\geq 0 \qquad (7)$$

may be imposed in connection with the sizes of w and $\alpha$.

The attribute cardinality degree determining unit 510 allocates the fault-related patterns of interest and the training patterns to y and x in the equations (5) or (6), and solves the problem of optimization to determine the degree of cardinality of each attribute of the fault-related pattern of interest. It is noted that, with the equation (5) or (6), the solution of w and that of $\alpha$ may not be found simultaneously. It is therefore necessary to separately solve the problem of maximizing w and the problem of maximizing $\alpha$.

Thus, with the attribute cardinality degree generation device 500, it is possible to automatically determine which one of the multiple attributes in the criterion change degree patterns, generated from past instances to detect a fault or estimate its cause, is high in cardinality to detect the fault in question or estimate its cause.

An attribute cardinality generation device for generating the degree of cardinality of an attribute, which attribute cardinality generation device may be used to advantage in a layered diagnostic device, configured to make diagnosis in a stratified fashion, as in the third exemplary embodiment, is now described.

Figure 18:
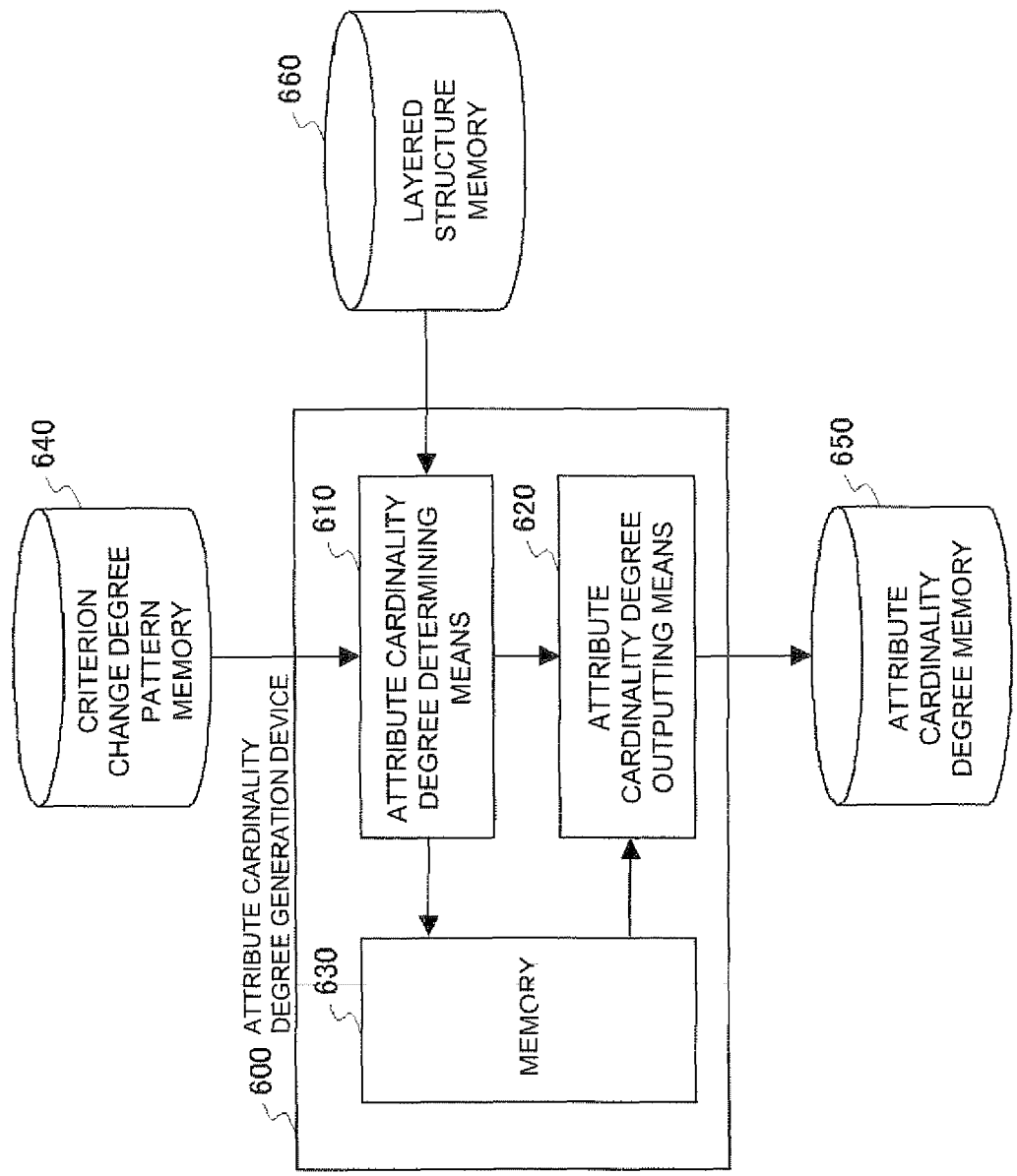
FIG. 18 is a block diagram showing another example of the attribute cardinality degree pattern generation device.

Referring to FIG. 18, an attribute cardinality degree generation device 600 includes an attribute cardinality degree determining unit 610, an attribute cardinality degree outputting unit 620 and a memory 630. A criterion change degree pattern memory 640, an attribute cardinality degree memory 650 and a layered structure memory 660 are attached to the attribute cardinality degree generation device 600. The attribute cardinality degree generation device receives data for diagnosis of a layered structure from the layered structure memory 660, while also receiving a set of a criterion change degree pattern and an event associated therewith, from the criterion change degree pattern memory 640. The attribute cardinality degree generation device then decides on the cardinality degree of each attribute in the criterion change degree pattern used in each layer to detect a fault or to estimate its cause. The attribute cardinality degree generation device then records the cardinality degree of each attribute in the attribute cardinality degree memory 650.

The criterion change degree pattern memory 640 has stored therein a plurality of criterion change degree patterns, associated with a plurality of fault-related events, as shown in FIG. 4, and a plurality of criterion change degree patterns, associated with a plurality of events indicating a normal state, as shown in FIG. 5. The criterion change degree pattern memory 640 may be the same as or different from the criterion change degree pattern memory 450 shown in FIG. 13.

The layered structure memory 660 holds in store the data of a layered structure of an event-to-be-diagnosed. FIG. 19 shows an instance of data of a layered structure in which seven criterion change degree patterns of pattern numbers 11 to 17 shown in FIG. 4 are used as the criterion change degree patterns associated with fault-related events. The faults A to C are detected in the first layer and the causes of the faults are estimated in the second layer. The data of the layered structure is analogous with that shown in FIG. 10, except that the total of the criterion change degree patterns 11, 12 of the lower layer of the fault A are specified as the criterion change degree patterns used for detecting the fault A in the first layer. The same may be said of the faults B and C.

Using a predetermined evaluation function, the attribute cardinality degree determining unit 610 decides on the degree of cardinality of each attribute of the criterion change degree pattern belonging to the event for the event type of fault on each layer, from one type to another. The criterion change degree pattern memory then records the cardinality degree, thus decided on, in the memory 630.

The attribute cardinality degree outputting unit 620 reads out, from the memory 530, the event-by-event degree of cardinality of each attribute of each layer, decided on by the attribute cardinality degree determining unit 610. The attribute cardinality degree outputting unit then records the cardinality degree, thus read out, in the attribute cardinality degree memory 650. The attribute cardinality degree memory 650 may be the same as or different from the attribute cardinality degree memory 220 of the diagnostic device 300 described above.

The global operation of the attribute cardinality degree generation device 600 will now be described.

Figure 20:
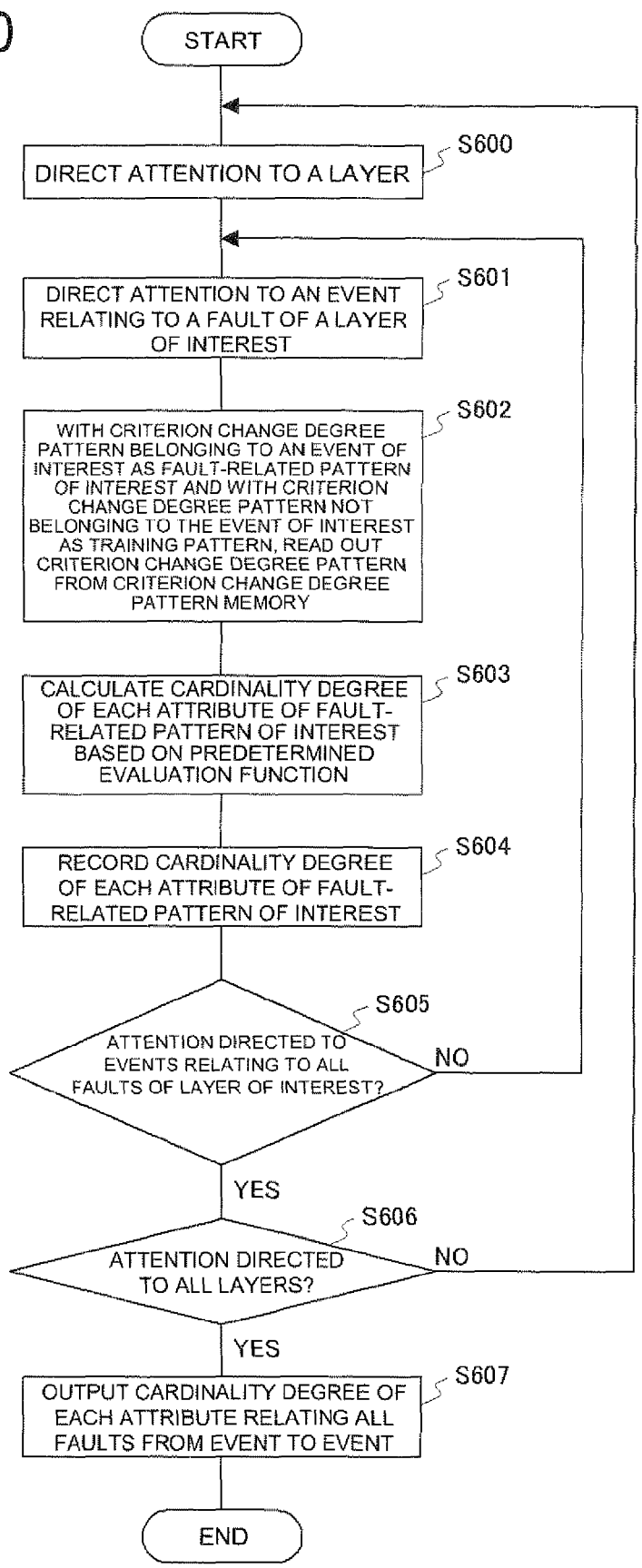
FIG. 20 is a flowchart showing another example of processing by the attribute cardinality degree generation device.

Referring to FIG. 20, the attribute cardinality degree determining unit 610 of the attribute cardinality degree generation device 600 first directs its attention to the first layer of the data of the layered structure stored in the layered structure memory 660 (S600). The attribute cardinality degree determining unit then directs its attention to the event of a fault of the first layer of interest, for example, the event of the fault A (S601). The attribute cardinality degree determining unit then reads out a criterion change degree pattern belonging to the event of interest, as a fault-related pattern of interest, and a criterion change degree pattern not belonging to the event of interest, as a training pattern, from the criterion change degree pattern memory 640 (S602). Like the attribute cardinality degree determining unit 510 of the attribute cardinality degree generation device 500 of FIG. 16, the attribute cardinality degree determining unit 610 calculates the degree of cardinality of each attribute of the fault-related pattern of interest based on a predetermined evaluation function (S603). The attribute cardinality degree determining unit then records the result calculated in the memory 630 (S604). The degree of cardinality of each attribute, in case of using the criterion change degree pattern of the pattern number 11 or 12 of FIG. 4 or the criterion change degree pattern of its expected value to detect the fault A, has thus been determined.

The same processing as that described above is reiterated for events related with the other faults B and C of the first layer stored in the criterion change degree pattern memory 640. After the processing on the total of the events of the first layer has come to a close (YES in a step S605), attention is directed to the second layer. Processing reverts to the step S600 to reiterate the processing described above. The cardinality degree of each attribute of the criterion change degree pattern that estimates the cause of the fault detected may thus be found. With the processing focused on the event of the fault A by the cause a1, the criterion change degree pattern of the pattern number 12 is the fault-related pattern of interest, with the remaining criterion change degree pattern(s) being the training pattern(s). The degree of cardinality of each attribute in case of using the criterion change degree pattern of the pattern number 12 to estimate the cause of the fault A that has occurred may thus be determined.

When the processing focused on the total of the layers has come to a close (YES in the step S606), the attribute cardinality degree outputting unit 620 of the attribute cardinality degree generation device 600 outputs the event-by-event degree of cardinality of each attribute related with the faults recorded in the memory 630 to the attribute cardinality degree memory 550 (S607). Processing then comes to a close.

Thus, with the attribute cardinality degree generation device 600, in case there are a plurality of criterion change degree patterns, generated from past instances to estimate the cause of the fault, and a plurality of causes as the subjects for estimation, it is possible to automatically estimate the attributes cardinal in cause estimation from one cause to another. In addition, it is possible to automatically determine which attribute is cardinal to detect the same fault without relying upon the cause of the fault.

In the diagnostic devices of the above-described exemplary embodiments, diagnosis is made by pattern matching between the criterion change degree patterns and the diagnostic object change degree pattern. In the exemplary embodiment, now described, such a diagnostic device is described in which a set of diagnostic rules is learned based on the criterion change degree patterns and in which the so learned diagnostic rules are applied to the diagnostic object change degree pattern to make the diagnosis.

[Fourth Exemplary Embodiment]

Figure 21:
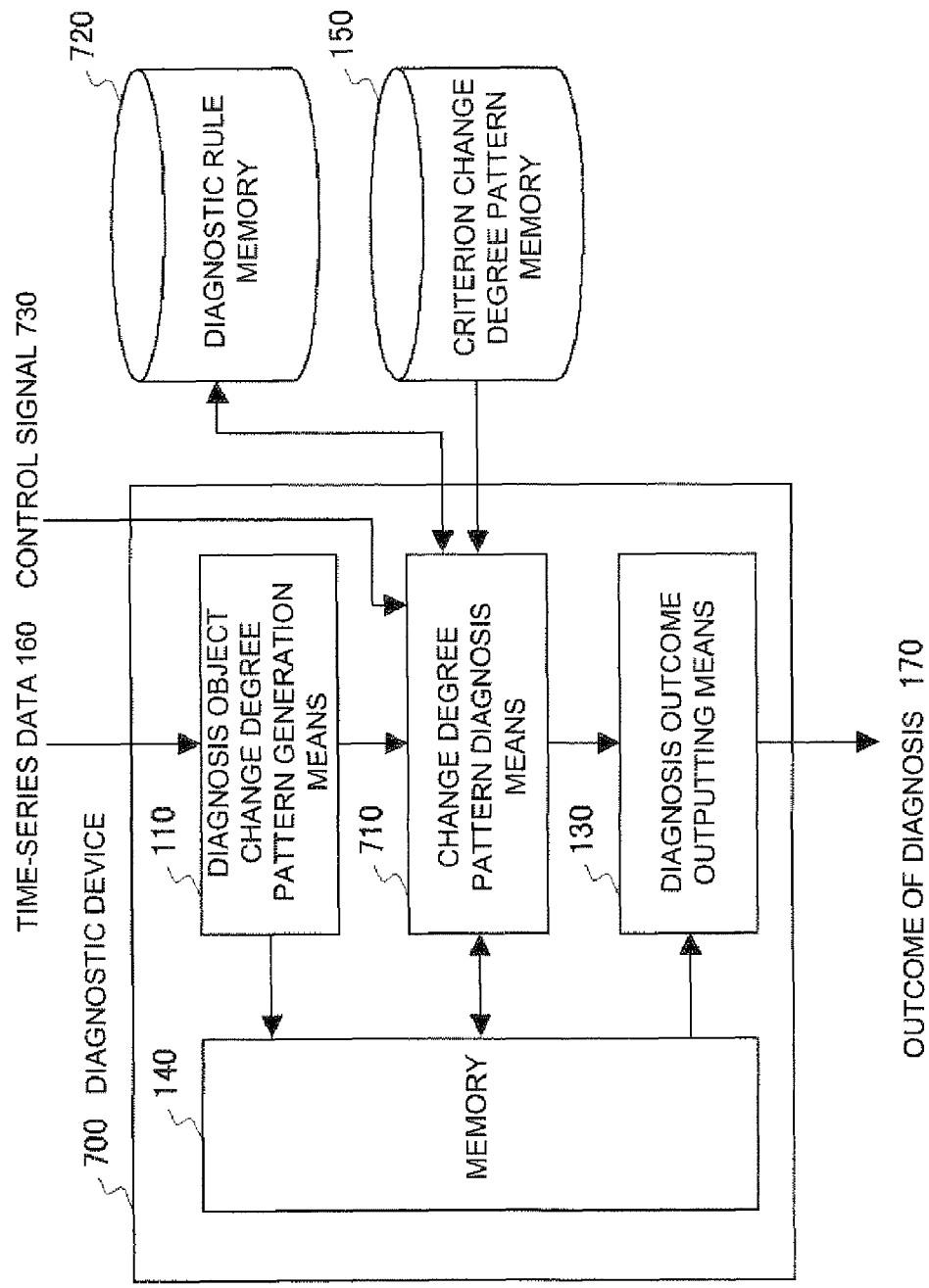
FIG. 21 is a block diagram of a diagnostic device according to a fourth exemplary embodiment of the present invention.

Referring to FIG. 21, a diagnostic device 700 according to a fourth exemplary embodiment of the present invention differs from the diagnostic device 100 of the first exemplary embodiment, as to having a change degree pattern diagnosis unit 710 in place of the change degree pattern diagnosis unit 120, and as to connection of a diagnostic rule memory 720 to the diagnostic device. In the criterion change degree pattern memory 150, there are stored a number of criterion change degree patterns sufficient to learn the diagnostic rules on the event-by-event basis.

The change degree pattern diagnosis unit 710 has two modes, namely a learning mode and a diagnostic mode. The learning mode may be switched to the diagnostic mode and vice versa by a control signal 730. In the learning mode, the diagnostic rule(s) to estimate the state of the object being diagnosed from the change degree pattern is learned using the criterion change degree patterns stored in the criterion change degree pattern memory 150. The so learned diagnostic rules are stored in the diagnostic rule memory 720. In the diagnostic mode, the diagnostic rules, saved in the diagnostic rule memory 720, are read out and applied to the diagnostic object change degree pattern generated by the diagnostic object change degree pattern generation unit 110 to diagnose the object being diagnosed. The outcome of the diagnosis is recorded in the memory 140.

A global example operation of the diagnostic device 700 of the present exemplary embodiment is now described in detail.

Figure 22:
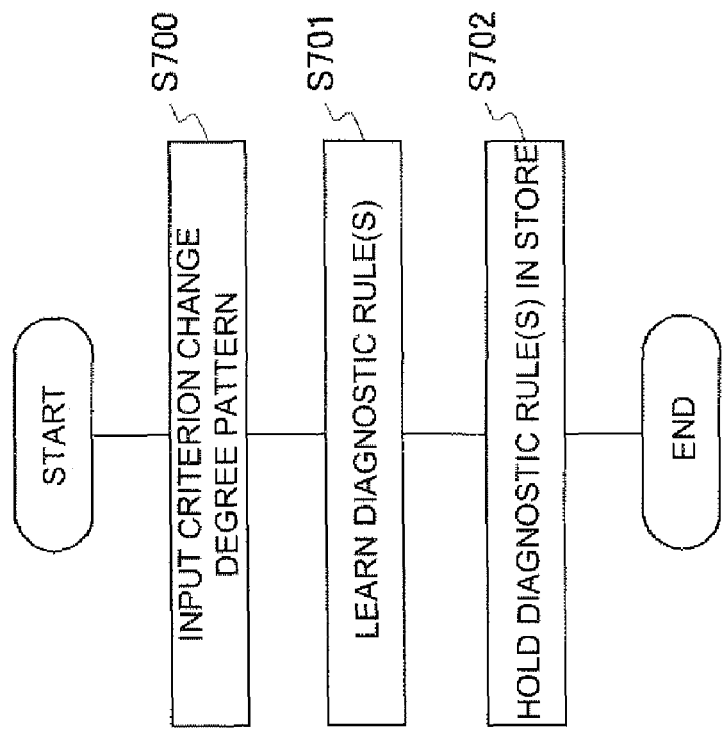
FIG. 22 is a flowchart showing an example of processing in a learning mode by the diagnostic device according to the fourth exemplary embodiment of the present invention.

On switching to the learning mode, by the control signal 730, the diagnostic device 700 commences the processing shown in FIG. 22. That is, the change degree pattern diagnosis unit 710 reads out the criterion change degree pattern from the criterion change degree pattern memory 150 (S700) to learn the diagnostic rule(s) using the so read out criterion change degree pattern (S701). The diagnostic rule(s) learned is stored in the diagnostic rule memory 720 (S702).

According to the present invention, the diagnostic rule(s) may be learned using an optional learning method. Several representative learning methods will now be explained.

Among example methods for learning the diagnostic rules, there is a method of learning diagnostic rules by a discriminator. Specifically, learning is made using linear discriminative learning, a neural network, a K-proximity discriminator, a support vector machine or a decision tree. With these methods, data labeled with an event is delivered as input, and a function that outputs an unknown label of the data is learned. In this case, data labeled with an event corresponds to the criterion change degree pattern, and the data with an unknown label corresponds to the diagnostic object change degree pattern. The aforementioned function corresponds to the diagnostic rules. The learning in case the learning data has an event-related label is called supervised learning. If the event label is attached partially at the time of learning, the learning is called semi-supervised learning. In both of these cases, learning of the diagnostic rules is possible. With a diagnosis, given later on, the diagnostic object change degree pattern is entered to the diagnostic rules (learned function) to find an event of the diagnostic object change degree pattern in question to make diagnosis.

Another instance of learning the diagnostic rules is a method of learning the diagnostic rules by correlation rules. The correlation rules may be exemplified by a rule: (an attribute A is changed and an attribute B is changed)→ (an attribute C is changed), in connection with e.g., an event X. Learning is made based on a plurality of criterion change degree patterns and the rules are written in the if-then form. The latter diagnosis is made by verifying to which event fits the diagnostic object change degree pattern based on event-by-event diagnostic rules (correlation rule).

Another way of learning the diagnostic rules is a method by an abnormality detection technique. Specifically, as disclosed for example in Patent Document 3, the statistic distribution, such as mixed normal distribution, of the criterion change degree patterns related with each event, is learned, and sufficient statistic values of the statistic distribution, such as an average value and dispersion in the case of normal distribution, are taken to be the diagnostic rules. The subsequent diagnosis is made by the abnormality degree of the diagnostic object change degree pattern, such as logarithmic loss or Hellinger score, calculated from the diagnostic rules (statistic distribution). It is also possible to calculate the degree of abnormality based not on the statistic distribution but on the distance from the proximity data, as disclosed in Non-Patent Document 3. It is furthermore possible to decide on whether or not data belongs to a diagnosis object event by a one class support vector machine, as disclosed in Non-Patent Document 4.

It is noted that the diagnostic rules learned may include not only the diagnostic rules to detect a fault and the diagnostic rules to estimate the cause of the fault that has occurred, but also the diagnostic rules to detect that the system is in a normal operating condition.

Figure 23:
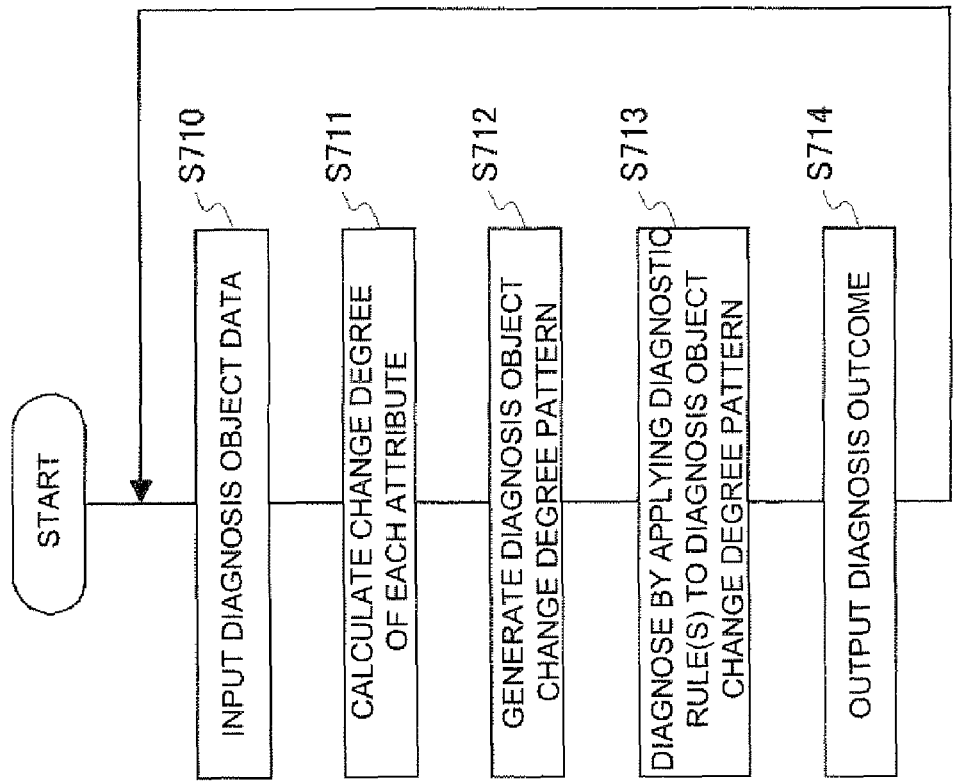
FIG. 23 is a flowchart showing an example of processing in a diagnostic mode by the diagnostic device according to the fourth exemplary embodiment of the present invention.

The operation of the diagnostic mode will now be explained. Referring to FIG. 23, the diagnostic object change degree pattern generation unit 110 of the diagnostic device 700 receives the time-series data 160, inclusive of an m-number of attributes, measured at time t1 from an object being diagnosed, as diagnostic subject data (S710). The diagnostic object change degree pattern generation unit then calculates the change degree values for each attribute included in the time-series data 160 (S711). A pattern $(z_1^1, z_1^2, \ldots, z_1^m)$ which is a combination the change degree values of respective attributes is generated as a sole diagnostic object change degree pattern $z_1$ and recorded in the memory 140 (S712). The operation up to this is the same as the operation of the first exemplary embodiment.

The change degree pattern diagnosis unit 710 then reads out the diagnostic object change degree pattern $z_1$ generated by the diagnostic object change degree pattern generation unit 110 from the memory 140 to make diagnosis using the diagnostic rules stored in the diagnostic rule memory 720. The outcome of the diagnosis is recorded in the memory 140 (S713). In more detail, if the diagnostic rule is a function by learning with a discriminator, the diagnostic object change degree pattern $z_1$ is entered into the function to estimate the event of the pattern $z_1$. If the diagnostic rule is a correlation rule, the change degree pattern diagnosis unit makes diagnosis by searching which correlation rule of which event the diagnostic object change degree pattern $z_1$ satisfies optimally. Further, if the diagnostic rule is that learned by the abnormality detection technique, the change degree pattern diagnosis unit makes diagnosis based on the degree of abnormality of the diagnostic object change degree pattern calculated from the diagnostic rule(s), such as statistic distribution.

The diagnosis outcome outputting unit 130 then reads out the result of the diagnosis of the change degree pattern diagnosis unit 710 from the memory 140 to output the outcome (S714). It is noted that the outcome of the diagnosis that the operating condition is normal may also be output in addition to the outcome that a certain fault has been detected or to the outcome that the fault has occurred from a certain cause. If the diagnostic device is using the diagnostic rule(s) to detect the fault or its cause and the diagnostic rule(s) to detect a normal operating state, it may output an outcome of the diagnosis to the effect that the fault of an unknown nature has occurred. This diagnosis is delivered as the outcome of the diagnosis for a case where a diagnosis object has not been diagnosed to be normal by the diagnostic rules to detect the normal condition and no fault of the diagnosis object has been detected by the diagnostic rule(s) to detect the fault.

When the processing for diagnosis for the time-series data 160, as measured from the object being diagnosed at time t1, has come to a close, the diagnostic device 700 reverts to step S710 to reiterate the processing for time-series data 160 measured at the next time point.

The meritorious effect of the present exemplary embodiment is now described.

In the present exemplary embodiment, the meritorious effect similar to that described above in connection with the first exemplary embodiment may be derived. In addition, in case a large number of criterion change degree patterns are obtained for the same fault, the diagnosis given by the present exemplary embodiment is more robust than that obtained by the diagnostic device 100 of the first exemplary embodiment. The reason is that the diagnostic rules learned from larger numbers of the criterion change degree patterns has a power of expression as a diagnostic model higher than in case of diagnosing the diagnostic object change degree pattern based on pattern matching with the criterion change degree patterns.

[Fifth Exemplary Embodiment]

Figure 24:
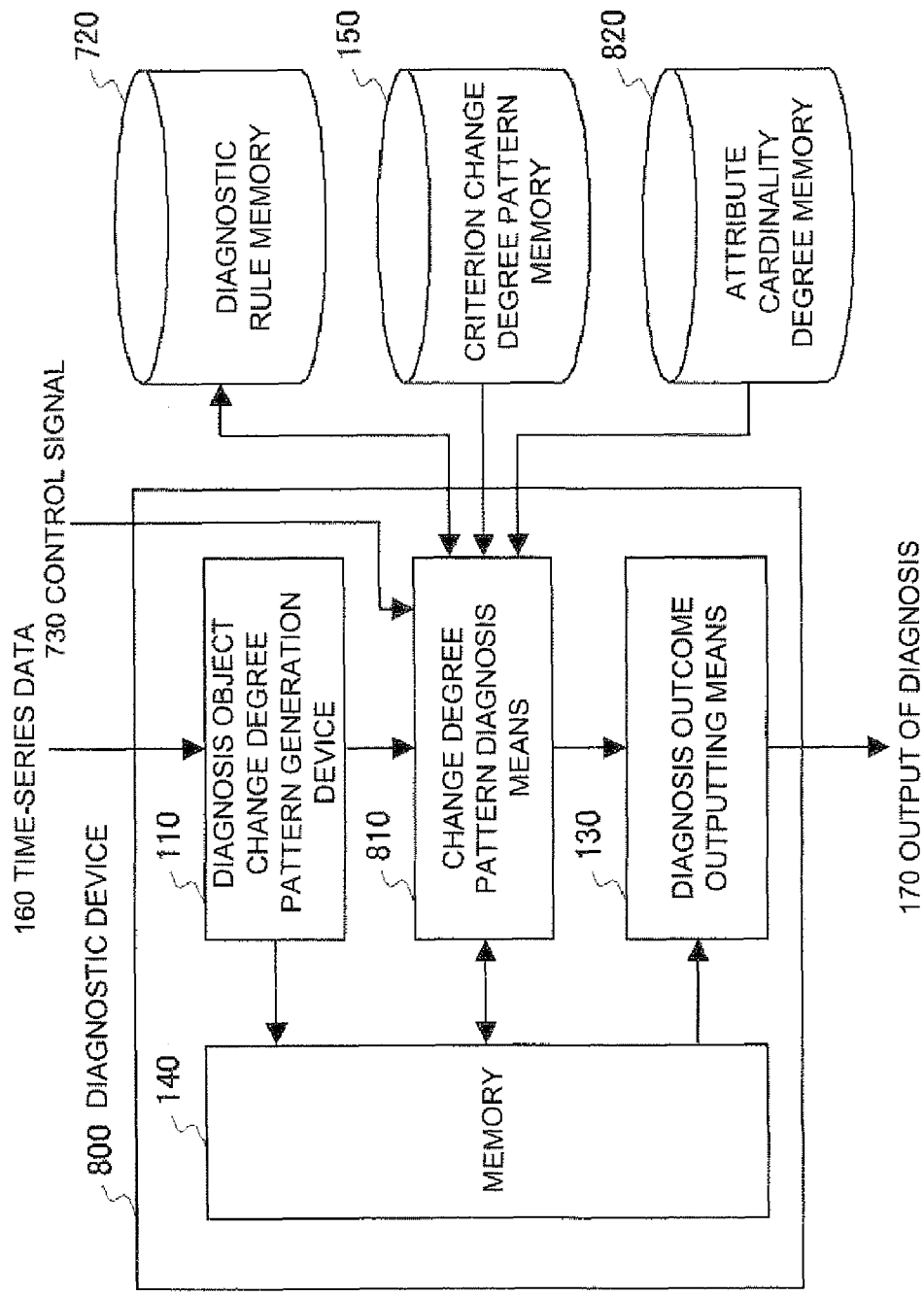
FIG. 24 is a block diagram showing a diagnostic device according to a fifth exemplary embodiment of the present invention.

Referring to FIG. 24, a diagnostic device 800 according to a fifth exemplary embodiment of the present invention differs from the diagnostic device 700 of the fourth exemplary embodiment, shown in FIG. 21, as to having a change degree pattern diagnosis unit 810 in place of the change degree pattern diagnosis unit 710, and as to connection of an attribute cardinality degree memory 820 to the diagnostic device.

Like the attribute cardinality degree memory 220 of the diagnostic device 200 of the second exemplary embodiment, the attribute cardinality degree memory 820 holds in store the values of the cardinality degree of respective attributes in the diagnosis of the event in question, in association with the event-to-be-diagnosed, as shown for example in FIG. 8. The degree of cardinality of each attribute in the diagnosis of an event in question may be a plurality of events allocated on the event-by-event basis or a sole attribute allocated to a plurality of events for their discrimination.

The change degree pattern diagnosis unit 810 differs from the change degree pattern diagnosis unit 710 of the diagnostic device 700 of the fourth exemplary embodiment in that, in learning the diagnostic rules using the criterion change degree patterns stored in the criterion change degree pattern memory 150, the degree of cardinality of each attribute stored in the attribute cardinality degree memory 820 in association with diagnosis object of the criterion change degree pattern is taken into account. In other respects, the change degree pattern diagnosis unit 810 has the same function as that of the change degree pattern diagnosis unit 710.

A global operation example of the diagnostic device 800 of the present exemplary embodiment will now be explained in detail.

The operation of the diagnostic device 800 of the present exemplary embodiment is similar to that of the diagnostic device 700 of the fourth exemplary embodiment, shown in FIG. 21, except the processing of learning the diagnostic rules in the step S701 of FIG. 22. In the present exemplary embodiment, the following processing is performed in the step S701:

In learning the diagnostic rules, using the criterion change degree patterns read out from the criterion change degree pattern memory 150, the change degree pattern diagnosis unit 810 reads out the degree of cardinality of each attribute in an event of the criterion change degree patterns from the attribute cardinality degree memory 820. The change degree pattern diagnosis unit performs learning as it takes the degree of cardinality of each attribute into account. Specifically, the change degree pattern diagnosis unit learns the diagnostic rules using only those attributes left after excluding the attributes whose cardinality degree values are lower than a predetermined threshold value. There is also such a method in which the dimension of the criterion change degree patterns is compressed to a lower value by a dimension compression unit, such as, in particular, discriminant analysis or principal component analysis, in consideration of the degree of cardinality effective for event discrimination, and to learn the diagnostic rules in the resulting lower dimension. There is furthermore such a method in which, in calculating an error by the weighted least square method in discriminator learning, the degree of cardinality of each attribute is used as weight. For other error criterions, the degree of cardinality of attributes may similarly be used for learning. With a distance-based discriminator, such as a K-proximity discriminator, the degree of cardinality of attributes may be used as $w_i$ in the equation used for calculating the similarity degree, such as the equation (2), in order to enable learning in consideration of the degree of cardinality of each attribute.

The meritorious effect of the present exemplary embodiment is now described.

With the present exemplary embodiment, a meritorious effect similar to that of the fourth exemplary embodiment may be derived. In addition, since the diagnostic rules may be improved in accuracy, a diagnosis may be improved in accuracy, for the following reason:

If the object being diagnosed is a small-sized system for which a total of attributes included in the time-series data 160 are relevant to each event-to-be-diagnosed, there is no problem raised even in case the diagnostic rules are learned based on the total of the attributes. However, if the object-to-be-diagnosed is a complex device or system, the time-series data 160, measured from the device or system, includes larger numbers of attributes. Among these, there may be wholly irrelevant attributes, depending on the sorts of the events. Thus, if the diagnostic rules are learned based on the entire attributes, the probability is high that the diagnostic rule is deteriorated in accuracy under the influence of the irrelevant attributes. According to the present exemplary embodiment, in which the diagnostic rules are learned in consideration of the degree of cardinality of each attribute, it is possible to prepare the diagnostic rules that are affected by irrelevant attributes only to a small extent.

[Sixth Exemplary Embodiment]

Figure 25:
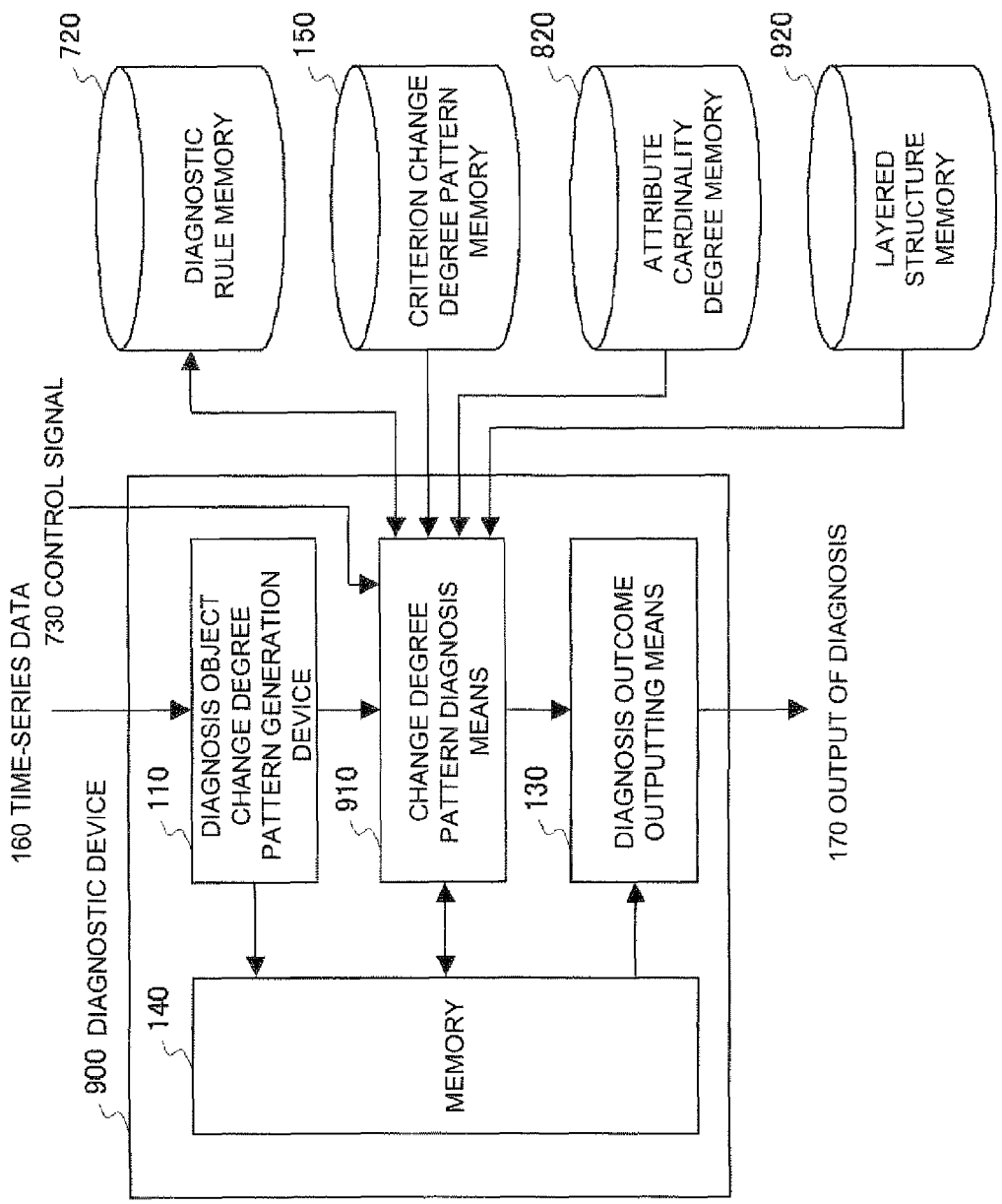
FIG. 25 is a block diagram showing a diagnostic device according to a sixth exemplary embodiment of the present invention.

Referring to FIG. 25, a diagnostic device 900 according to a sixth exemplary embodiment of the present invention differs from the diagnostic device 800 of the fifth exemplary embodiment, shown in FIG. 24, as to having a change degree pattern diagnosis unit 910 in place of the change degree pattern diagnosis unit 810, and as to connection of a layered structure memory 920 to the diagnostic device.

Like the attribute cardinality degree memory 660 of the attribute cardinality degree generation device 600, shown in FIG. 18, the layered structure memory 920 holds in store the data of a layered structure of an event-to-be-diagnosed. FIG. 19 shows the data of the layered structure in which the first layer detects faults A to C and the second layer estimates their causes. It is noted that, in FIG. 19, the number of the criterion change degree patterns, associated with the events of the respective layers, is only several at most. However, in the case of learning by the diagnostic rules, a number of criterion change degree patterns, sufficient for rule learning, are used.

A global example operation of the diagnostic device 900 of the present exemplary embodiment is now described in detail. Initially, the operation of the learning mode is described.

Figure 26:
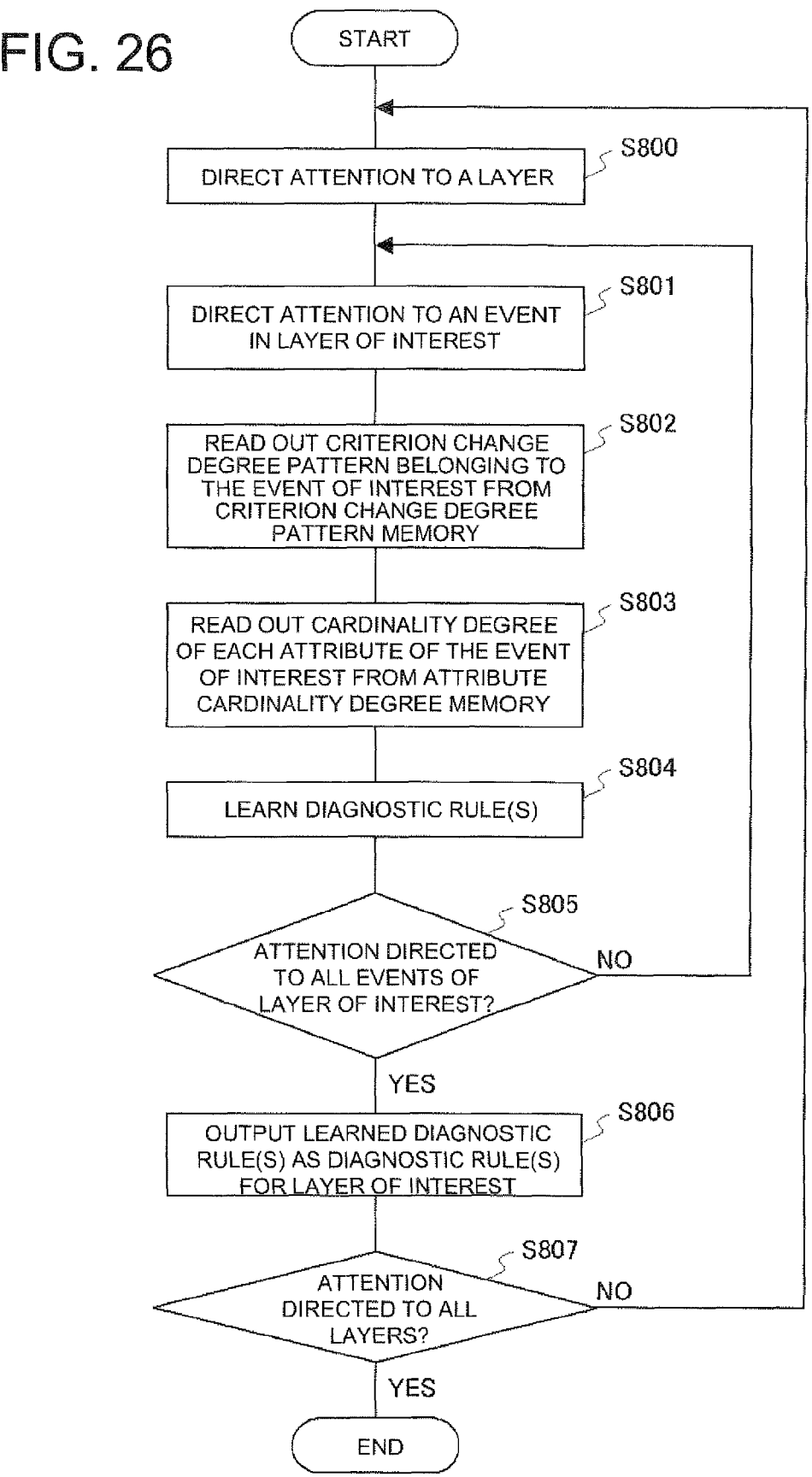
FIG. 26 is a flowchart showing an example of processing in a learning mode by the diagnostic device according to the sixth exemplary embodiment of the present invention.

On switching to the learning mode by the control signal 730, the diagnostic device 900 initiates the processing shown in FIG. 26. Initially, the change degree pattern diagnosis unit 910 directs its attention to the first layer of the layered data stored in the layered structure memory 920 (S800). The change degree pattern diagnosis means then directs its attention to a sole event of the first layer of interest (S801). The change degree pattern diagnosis unit then reads out the criterion change degree patterns belonging to an event of interest from the criterion change degree pattern memory 150 (S802), while reading out the degree of cardinality of each attribute of the event of interest from the attribute cardinality degree memory 820 (S803). The change degree pattern diagnosis unit then learns the diagnostic rules, as the cardinality degree of each attribute is taken into account, in a manner similar to the case of the change degree pattern diagnosis unit 810 of the diagnostic device 800 of the fifth exemplary embodiment (S804). The same processing is reiterated for the other events of the first layer stored in the criterion change degree pattern memory 150. When the learning based on the criterion change degree patterns of the total of the events of the first layer has come to a close (YES of the step S805), the change degree pattern diagnosis unit outputs the so learned diagnostic rules as the diagnostic rules for the first layer to the diagnostic rule memory 720 (step S806).

For example, if the diagnostic rules are learned using discriminator learning for the layered structure shown in FIG. 19, a label of the fault A is afforded to the criterion change degree patterns relevant to the causes a1 and a2. Also, a label of the fault B is afforded to the criterion change degree patterns relevant to the causes b1 and b2, and a label of the fault C is afforded to the criterion change degree patterns relevant to the causes c1, c2 and c3. By discriminator learning, the diagnostic rules for diagnosing the faults A, B and C are learned as the diagnostic rules for the first layer.

When learning of the diagnostic rules for the first layer is finished, the change degree pattern diagnosis unit 910 focuses its attention on the second layer (S800) and reiterates the processing similar to that for the first layer to learn the diagnostic rules of the second layer. In learning the diagnostic rules for the layered structure of FIG. 19, using the discriminator learning, the change degree pattern diagnosis unit affords a label of the cause a1 to the criterion change degree patterns relevant to the cause a1. The change degree pattern diagnosis unit also affords a label of the cause a2 to the criterion change degree patterns relevant to the cause a2, and learns the diagnostic rules for diagnosing whether the cause of the fault A is a1 or a2 by the discriminator learning. In similar manner, the change degree pattern diagnosis unit learns the diagnostic rules for diagnosing whether the cause of the fault B is b1 or b2 and the diagnostic rules for diagnosing whether the cause of the fault C is c1, c2 or c3. The so learned diagnostic rules are taken to be the diagnostic rules for the second layer.

When the total of the layers has been attended to by the change degree pattern diagnosis means 910, the processing comes to a close (YES in S807).

Figure 27:
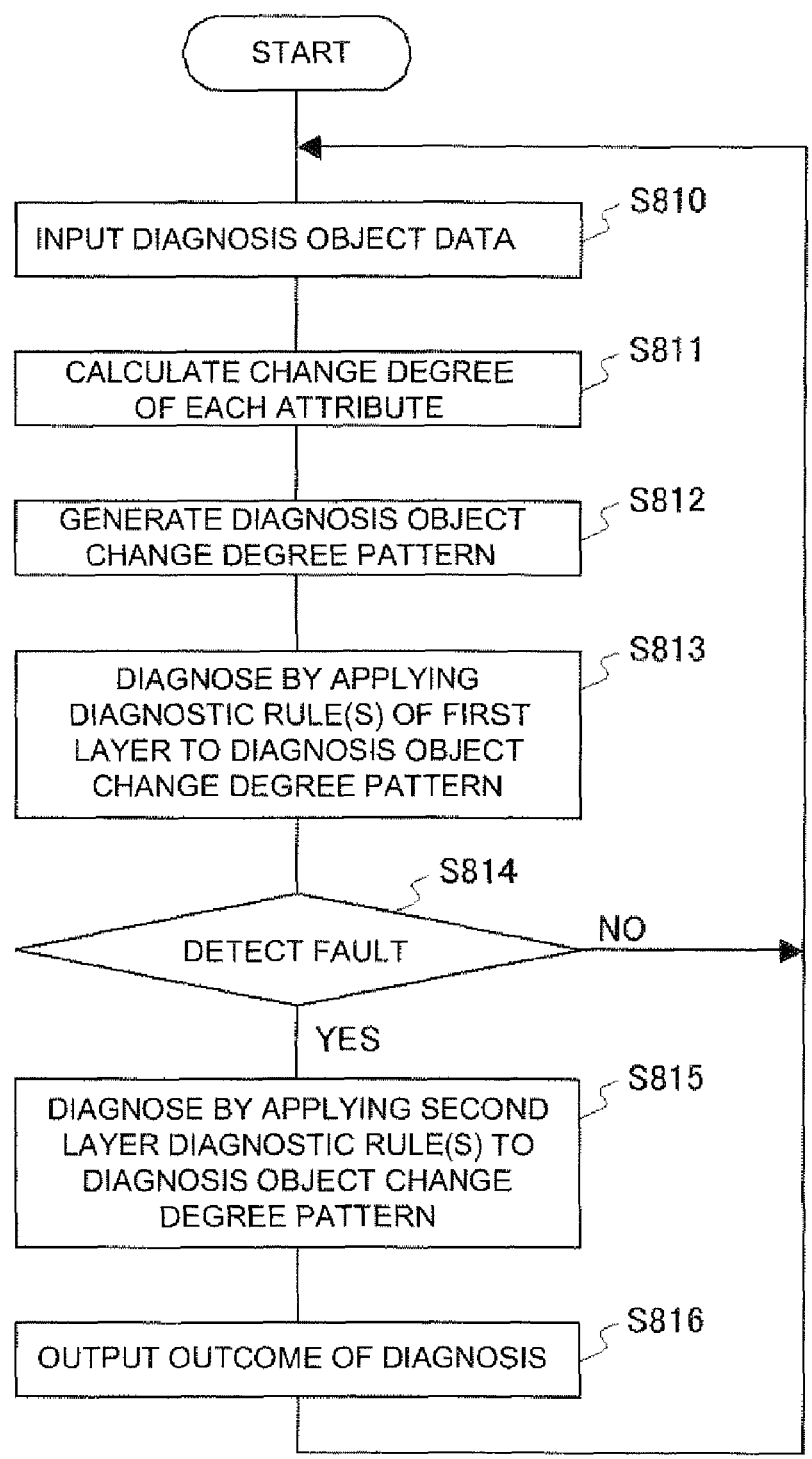
FIG. 27 is a flowchart showing an example of processing in a diagnostic mode by the diagnostic device according to the sixth exemplary embodiment of the present invention.

The operation for the diagnostic mode is now described. Referring to FIG. 27, the diagnostic object change degree pattern generation unit 110 of the diagnostic device 900 generates a diagnostic object change degree pattern $z_1$ from the time-series data 160 including an m-number of attributes as measured at time t1 from the object being diagnosed. The diagnostic object change degree pattern generation unit then records the pattern $z_1$ in the memory 140 (S810 to S812). The operation up to this is similar to the operation of the fifth exemplary embodiment.

The change degree pattern diagnosis unit 910 then reads out the diagnostic object change degree pattern $z_1$ generated by the diagnostic object change degree pattern generation unit 110 from the memory 140. The change degree pattern diagnosis unit effects diagnosis using the diagnostic rules for the first layer, stored in the diagnostic rule memory 720, to record the result of the diagnosis in the memory 140 (S813). Thus, in the example, described above, it is detected which of the faults A, B and C has occurred, or whether none of these faults has occurred. If none of the faults has occurred, processing reverts to the step S810.

If a fault is detected (YES of the step S814), the change degree pattern diagnosis unit 910 makes diagnosis, using the diagnostic rules for the second layer to estimate the cause of the detected fault, to record the result of the diagnosis in the memory 140 (S815). For example, if, in the above example, the fault A is detected, diagnosis is made using the diagnostic rules to diagnose whether the cause of the fault A is the cause a1 or the cause a2.

The diagnosis outcome outputting unit 130 reads out the outcome of diagnosis by the change degree pattern diagnosis unit 910 from the memory 140 to output the outcome of the diagnosis (S816).

When the processing for diagnosis for the time-series data 160, as measured at time t1 from the object being diagnosed, has come to an end, the diagnostic device 900 reverts to the step S810 to reiterate the same processing as above on time-series data 160 measured at the next time point.

The meritorious effect of the present invention is now explained.

With the present exemplary embodiment, the meritorious effect similar to that of the fifth exemplary embodiment may be obtained. In addition, layer-by-layer diagnosis may be carried out robustly.

[Modification of the Sixth Exemplary Embodiment]

In the sixth exemplary embodiment, the diagnostic rules of respective layers are learned as the degree of cardinality of an attribute is exploited. In the present modification, the diagnostic rules of the respective layers are learned without using the degree of cardinality of attributes. Thus, in the present modification, the attribute cardinality degree memory 820 of FIG. 25 is omitted. On the other hand, an expected value, such as an average value, of a plurality of criterion change degree patterns of the second layer relevant to the same fault is set as the criterion change degree pattern of the first layer pattern set to be stored in the criterion change degree pattern memory 150.

The operation of the present modification is wholly the same as that of the sixth exemplary embodiment except not using the attribute cardinality degree.

[Other Exemplary Embodiments]

Figure 28:
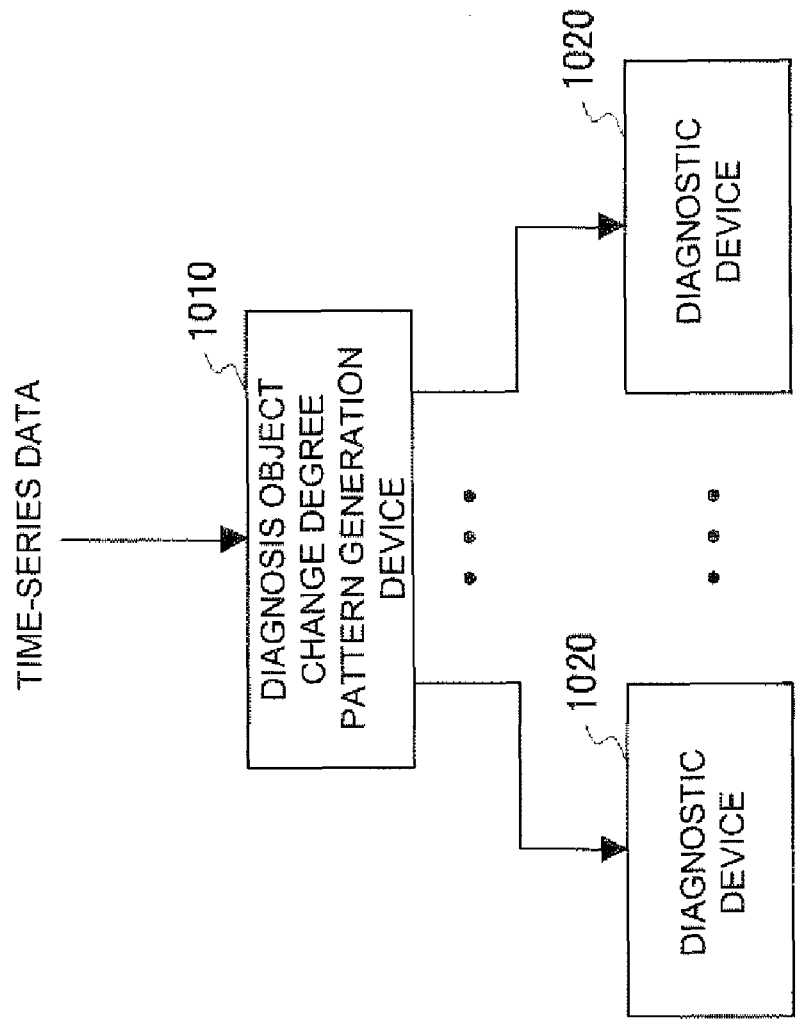
FIG. 28 is a schematic block diagram showing a set of diagnostic devices according to a further exemplary embodiment of the present invention.

The diagnostic device of each of the above-described respective exemplary embodiments is provided with the diagnostic object change degree pattern generation unit 110. Alternatively, a device that performs the operation of the diagnostic object change degree pattern generation unit 110 may be provided outside the diagnostic device. In such case, the diagnostic object change degree pattern generation device and the diagnostic device need not be connected in a one-for-one relationship. That is, a plurality of diagnostic devices 1020 may be connected via a signal line or a communication network to a sole diagnostic object change degree pattern generation device 1010, as shown for example in FIG. 28. In case of multiplexing the processing, the same diagnostic object change degree pattern generated by the diagnostic object change degree pattern generation device 1010 is transmitted to the multiple diagnostic devices 1020. An ultimate outcome of the diagnosis is generated by decision by a majority of the outcomes of the diagnosis by the multiple diagnostic devices. In case of parallel processing, the diagnostic object change degree patterns, generated by the diagnostic object change degree pattern generation device 1010, are distributed in regular order to the multiple diagnostic devices 1020 where diagnoses are made. In this case, the multiple diagnostic devices make up a diagnostic system.

Figure 29:
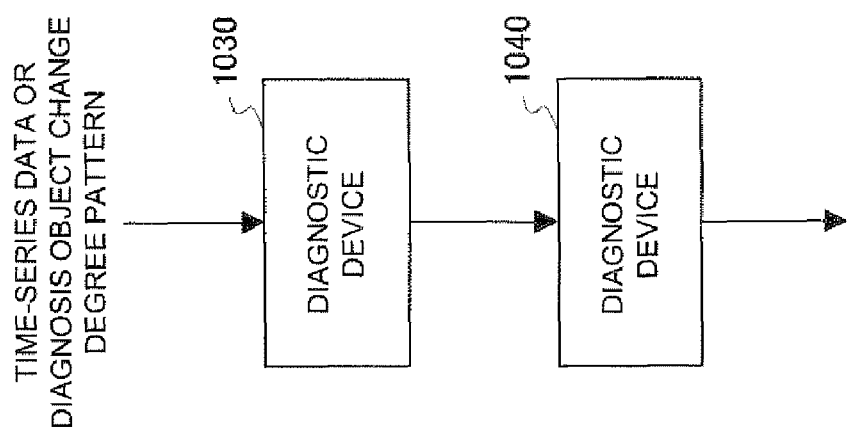
FIG. 29 is a schematic view showing another set of diagnostic devices according to a further exemplary embodiment of the present invention.

In the above exemplary embodiments, processing is performed in a sole diagnostic device. It is however also possible to interconnect a plurality of diagnostic devices over a network for reciprocal communication to constitute a diagnostic system so that processing for diagnosis will be carried out in each diagnostic device. If diagnosis is to be conducted in a stratified manner, a plurality of diagnostic devices 1030, 1040 may be interconnected over signal lines and a communication network, as shown for example in FIG. 29. In his case, the multiple diagnostic devices that make up a diagnostic system may be run in operation in concerted fashion to perform stratified diagnosis. For example, the upper diagnostic device 1030 diagnoses the upper layer, for example, detects a fault. In case of fault detection, the outcome of the diagnosis and the original time-series data or the diagnostic object change degree pattern may then be transmitted from the diagnostic device 1030 to the diagnostic device 1040. The diagnostic device 1040 may then make diagnosis of the lower layer, for example, estimate the cause of the fault.

It is to be noted that the functions of the diagnostic device, criterion change degree pattern generation device and the attribute cardinality generation device of the present invention may be implemented by the hardware or by a computer in combination with a program for diagnosis. The diagnostic program may be provided as it is recorded on a computer-readable recording medium, such as a magnetic disc or a semiconductor memory. The program may be read by the computer on booting it. The computer may be run in operation as the diagnostic device, criterion change degree pattern generation device or as the attribute cardinality generation device in the above exemplary embodiments.

Industrial Applicability

The present invention may be used for diagnosis of a variety of devices and a variety of systems including LSI manufacturing plants. The present invention is not limited to mechanical systems and may be used as an analytic device for analysis of price fluctuations of securities, debts, investment trust, pension trust, exchange, securitized real estate, derivative financial instruments, such as futures, forwards, or options. As the attributes, the prices of the securities, weather data or frequency data indicating the degree of exposure in media such as newspapers of topics possibly affecting the securities may be used.

It is to be note that the particular exemplary embodiments or examples may be modified or adjusted within the gamut of the entire disclosure of the present invention, inclusive of claims, based on the fundamental technical concept of the invention. In addition, variegated combinations or selections of the elements disclosed herein may be made within the framework of the claims.

The invention claimed is:

1. A diagnostic device comprising:
a criterion change degree pattern memory that holds in store a criterion change degree pattern in association with an event-to-be-diagnosed;
said criterion change degree pattern being formed of a pattern of values of the degree of change of each attribute of data, including a plurality of attributes, measured from an object being diagnosed; and
change degree pattern diagnosis means for receiving a diagnostic object change degree pattern to make diagnosis of said object being diagnosed based on the received diagnostic object change degree pattern and said criterion change degree pattern stored in said criterion change degree pattern memory;
said diagnostic object change degree pattern being formed of a pattern of values of the degree of change of each attribute of data, including a plurality of attributes, of said object being diagnosed, measured from said object being diagnosed,
wherein said change degree pattern diagnosis means effects pattern matching between said diagnostic object change degree pattern and said criterion change degree patterns stored in said criterion change degree pattern memory to make diagnosis on an object being diagnosed based on a result of said pattern matching;
said diagnostic device further comprising:
attribute cardinality degree determining means for reading out the criterion change degree patterns from said criterion change degree pattern memory and for determining the degree of cardinality of each attribute in the criterion change degree pattern associated with an event-to-be-diagnosed;
said attribute cardinality degree determining means sorting, from one event-to-be-diagnosed to another, the criterion change degree patterns belonging to the event in question into a pattern of interest and a training pattern;
said pattern of interest being the criterion change degree pattern belonging to said event in question and said training pattern being the criterion change degree pattern belonging to remaining events; and
said attribute cardinality degree determining means determining the degree of cardinality of each attribute of said criterion change degree pattern belonging to said event in question using a predetermined evaluation function.

2. The diagnostic device according to claim 1, wherein said criterion change degree pattern memory holds in store the criterion change degree pattern, in accordance with a layered structure of the event-to-be-diagnosed, from one layer to another, and wherein said change degree pattern diagnosis means effects diagnosis by pattern matching using the criterion change degree pattern of an upper layer;
said change degree pattern diagnosis means effecting pattern matching using the criterion change degree pattern of a lower layer based on the outcome of diagnosis for the upper layer.

3. The diagnostic device according to claim 2, further comprising:
an attribute cardinality degree generation device that generates the attribute cardinality degree stored in said attribute cardinality degree memory;
said attribute cardinality degree generation device including: a criterion change degree pattern memory that holds in store, in association with an event-to-be-diagnosed, a criterion change degree pattern formed by a pattern of values of the degree of change of each attribute of data, including a plurality of attributes, measured from said object being diagnosed; a layered structure memory that holds in store data of a layered structure of an event-to-be-diagnosed;
attribute cardinality degree determining means for reading out data of the layered structure from said layered structure memory and reading out said criterion change degree pattern from said criterion change degree pattern memory;
said attribute cardinality degree determining means determining the degree of cardinality of said attributes in said criterion change degree pattern associated with said event for each layer as the object-to-be-diagnosed, from one event to another; and
attribute cardinality degree outputting means for outputting the event-by-event cardinality degree of each of said attributes determined by said attribute cardinality degree determining means.

4. The diagnostic device according to claim 1, wherein said criterion change degree pattern memory holds in store a criterion change degree pattern associated with a fault-related event; and
wherein said change degree pattern diagnosis means outputs a fault-related event associated with the criterion change degree pattern matched to said diagnostic object change degree pattern as the outcome of the diagnosis.

5. The diagnostic device according to claim 4, wherein said criterion change degree pattern memory further holds in store a criterion change degree pattern associated with a normal event; and
wherein said change degree pattern diagnosis means outputs, in connection with the diagnostic object change degree pattern not matched to any criterion change degree pattern associated with a normal event or to any criterion change degree pattern associated with said fault-related event, an outcome of the diagnosis to the effect that the diagnostic object change degree pattern is of an unknown fault.

6. A diagnostic device comprising:
a criterion change degree pattern memory that holds in store a criterion change degree pattern in association with an event-to-be-diagnosed;
said criterion change degree pattern being formed of a pattern of values of the degree of change of each attribute of data, including a plurality of attributes, measured from an object being diagnosed;
change degree pattern diagnosis means for receiving a diagnostic object change degree pattern to make diagnosis of said object being diagnosed based on the received diagnostic object change degree pattern and said criterion change degree pattern stored in said criterion change degree pattern memory;
said diagnostic object change degree pattern being formed of a pattern of values of the degree of change of each attribute of data, including a plurality of attributes, of said object being diagnosed, measured from said object being diagnosed;
diagnostic object change degree pattern generation means for calculating the degree of change of each attribute of said data, including a plurality of attributes, of said object being diagnosed, measured from said object being diagnosed, to generate said diagnostic object change degree pattern;
said diagnostic object change degree pattern being a combination of values of the degree of change of said attributes calculated; and
an attribute cardinality degree memory that holds in store the degree of cardinality of said attributes in association with the event-to-be-diagnosed;
said change degree pattern diagnosis means in effecting pattern matching between said criterion change degree pattern associated with said event-to-be-diagnosed and the diagnostic object change degree pattern taking into account the degree of cardinality of said attributes stored in said attribute cardinality degree memory in association with said event-to-be-diagnosed of said criterion change degree pattern.

7. The diagnostic device according to claim 6, further comprising:
an attribute cardinality degree generation device that generates the attribute cardinality degree stored in said attribute cardinality degree memory; said attribute cardinality degree generation device including: a criterion change degree pattern memory that holds in store, in association with an event-to-be-diagnosed, a criterion change degree pattern formed by a pattern of values of the degree of change of each attribute of data, including a plurality of attributes, measured from said object being diagnosed; said attribute cardinality degree determining means; and attribute cardinality degree outputting means for outputting the event-by-event cardinality degree of said attributes determined by said attribute cardinality degree determining means.

8. A diagnostic device comprising:
a criterion change degree pattern memory that holds in store a criterion change degree pattern in association with an event-to-be-diagnosed;
said criterion change degree pattern being formed of a pattern of values of the degree of change of each attribute of data, including a plurality of attributes, measured from an object being diagnosed;
change degree pattern diagnosis means for receiving a diagnostic object change degree pattern to make diagnosis of said object being diagnosed based on the received diagnostic object change degree pattern and said criterion change degree pattern stored in said criterion change degree pattern memory;
said diagnostic object change degree pattern being formed of a pattern of values of the degree of change of each attribute of data, including a plurality of attributes, of said object being diagnosed, measured from said object being diagnosed,
wherein said change degree pattern diagnosis means learns a set of diagnostic rules for making diagnosis of the state of said object being diagnosed from a change degree pattern, using the criterion change degree pattern stored in said criterion change degree pattern memory;
said change degree pattern diagnosis means applying the diagnostic rule learned to said diagnostic object change degree pattern to diagnose said object being diagnosed; and
an attribute cardinality degree memory that holds in store the degree of cardinality of said attributes in association with the event-to-be-diagnosed;
said change degree pattern diagnosis means in learning said diagnostic rules using the criterion change degree pattern associated with the event-to-be-diagnosed taking into account the degree of cardinality stored in said attribute cardinality degree memory in association with the event-to-be-diagnosed of said criterion change degree pattern.

9. A method for diagnosis comprising:
a first step of change degree pattern diagnosis means receiving a diagnostic object change degree pattern formed of a pattern of values of the degree of change of each attribute of data, including a plurality of attributes, measured from an object being diagnosed;
a second step of said change degree pattern diagnosis means reading out a criterion change degree pattern from a criterion change degree pattern memory and effecting diagnosis of said object being diagnosed based on said received diagnostic object change degree pattern and said criterion change degree pattern read out;
said criterion change degree pattern being formed of a pattern of values of the degree of change of each attribute of data, including a plurality of attributes, measured from said object being diagnosed being so far held in store in said criterion change degree pattern memory in association with the event-to-be-diagnosed; and
a third step of diagnostic object change degree pattern generation means for calculating the degree of change of each attribute of data, including a plurality of attributes, of said object being diagnosed measured from said object being diagnosed to generate said diagnostic object change degree pattern;
said diagnostic object change degree pattern being a combination of the values of the degree of change of said attributes calculated,
wherein said change degree pattern diagnosis means in effecting pattern matching between a criterion change degree pattern associated with an event-to-be-diagnosed and the diagnostic object change degree pattern reads out the degree of cardinality of said attributes of said criterion change degree pattern, associated with the event-to-be-diagnosed, from said attribute cardinality degree memory to effect pattern matching in consideration of the degree of cardinality of said attributes read out;
said degree of cardinality of said attributes being so far held in store by said attribute cardinality degree memory in association with said event-to-be-diagnosed.

10. A method for diagnosis comprising:
- a first step of change degree pattern diagnosis means receiving a diagnostic object change degree pattern formed of a pattern of values of the degree of change of each attribute of data, including a plurality of attributes, measured from an object being diagnosed; and
- a second step of said change degree pattern diagnosis means reading out a criterion change degree pattern from a criterion change degree pattern memory and effecting diagnosis of said object being diagnosed based on said received diagnostic object change degree pattern and said criterion change degree pattern read out;
- said criterion change degree pattern being formed of a pattern of values of the degree of change of each attribute of data, including a plurality of attributes, measured from said object being diagnosed being so far held in store in said criterion change degree pattern memory in association with the event-to-be-diagnosed,
- wherein said change degree pattern diagnosis means learns a set of diagnostic rules for diagnosing the state of said object-to-be-diagnosed from a change degree pattern, using the criterion change degree pattern stored in said criterion change degree pattern memory;
- said change degree pattern diagnosis means applying a diagnostic rule learned to said diagnostic object change degree pattern to diagnose said object being diagnosed, and
- wherein, in learning said diagnostic rule(s) using a criterion change degree pattern associated with a certain event-to-be-diagnosed, said change degree pattern diagnosis means reads out the degree of cardinality of said attributes of said criterion change degree pattern, associated with the event-to-be-diagnosed, from an attribute cardinality degree memory;
- said degree of cardinality of said attributes being so far held in store by said attribute cardinality degree memory in association with the event-to-be-diagnosed;
- said change degree pattern diagnosis means learning said diagnostic rules in consideration of the degree of cardinality of said attributes read out.

11. An attribute cardinality degree generation device comprising:
- a criterion change degree pattern memory that holds in store a plurality of criterion change degree patterns, each of which is formed of a pattern of the degree of change of each attribute of data, including a plurality of attributes, measured from an object being diagnosed, in association with an event-to-be-diagnosed;
- attribute cardinality degree determining means for reading out said criterion change degree patterns from said criterion change degree pattern memory and for determining the degree of cardinality of said attributes in said criterion change degree patterns associated with said event-to-be-diagnosed, from one event to another; and
- said attribute cardinality degree determining means sorting, for each event-to-be-diagnosed, the criterion change degree patterns into a pattern of interest and a training pattern; said pattern of interest being the criterion change degree pattern belonging to said event in question and said training pattern being the criterion change degree pattern belonging to remaining events; said attribute cardinality degree determining means determining the degree of cardinality of each attribute of said criterion change degree pattern belonging to said event in question using a predetermined evaluation function.

12. The attribute cardinality degree generation device according to claim 11, wherein said attribute cardinality degree determining means sorts the criterion change degree pattern(s), belonging to an event-to-be-diagnosed, into a pattern of interest and a training pattern, from one event-to-be-diagnosed to another;
- said pattern of interest being criterion change degree pattern belonging to an event in question and said training pattern being criterion change degree pattern belonging to other event(s);
- said attribute cardinality degree determining means determining the degree of cardinality of the respective attributes of the criterion change degree pattern(s) belonging to said event in question, using a predetermined evaluation function.

13. The attribute cardinality degree generation device according to claim 12, wherein said evaluation function is formed of one or more of first to third evaluation functions;
- said first evaluation function expressing the effect of determining the cardinality degree of each attribute of said pattern of interest so that the pattern of interest is globally not similar to the training pattern(s);
- said second evaluation function expressing the effect of determining the cardinality degree of each attribute of said pattern of interest so that said pattern of interest is globally not similar to the training pattern that is similar to said pattern of interest;
- said third evaluation function expressing the effect of determining the cardinality degree of each attribute of the pattern of interest so that patterns of interest are globally similar to one another.

14. An attribute cardinality degree generation device comprising:
- a criterion change degree pattern memory that holds in store a criterion change degree pattern, formed of a pattern of the degree of change of each attribute of data, including a plurality of attributes, measured from an object being diagnosed, in association with an event-to-be-diagnosed;
- attribute cardinality degree determining means for reading out data of a layered structure from said layered structure memory, reading out said criterion change degree pattern from said criterion change degree pattern memory, and for determining the degree of cardinality of said attributes in said criterion change degree pattern associated with said event-to-be-diagnosed, from one event to another; and
- attribute cardinality degree outputting means for outputting the cardinality degree of said attributes, determined by said attribute cardinality degree determining means, from one event to another.

15. The attribute cardinality degree generation device according to claim 14, wherein said evaluation function is formed of one or more of first, second and third evaluation functions;
- said first evaluation function expressing an effect of determining the cardinality degree of said attributes of said patterns of interest so that the patterns of interest are globally not similar to the training patterns;
- said second evaluation function expressing an effect of determining the cardinality degree of said attributes of said patterns of interest so that said patterns of interest are globally not similar to those training patterns that are similar to said patterns of interest;
- said third evaluation function expressing an effect of determining the cardinality degree of said attributes of said patterns of interest so that said patterns of interest are globally similar to one another.

16. A non-transient computer-readable storage medium storing a program for allowing a computer to operate as change degree pattern diagnosis means;
   said computer having a criterion change degree pattern memory that holds in store a criterion change degree pattern in association with an event-to-be-diagnosed;
   said criterion change degree pattern being formed of a pattern of values of the degree of change of each attribute of data, including a plurality of attributes, measured from an object being diagnosed;
   said change degree pattern diagnosis means receiving a diagnostic object change degree pattern to make diagnosis of said object being diagnosed based on the received diagnostic object change degree pattern and said criterion change degree pattern stored in said criterion change degree pattern memory;
   said diagnostic object change degree pattern being a pattern of values of the degree of change of each attribute of data, including a plurality of attributes, of said object being diagnosed as measured from said object being diagnosed;
   said program allowing execution of a process in which criterion change degree patterns are read out from said criterion change degree pattern memory, and in which attribute cardinality degree determining means determine the degree of cardinality of respective attributes in the criterion change degree patterns associated with events-to-be-diagnosed, sort the criterion change degree patterns belonging to events in question as a pattern of interest and sort the criterion change degree pattern(s) belonging to other events as training pattern(s), from one event-to-be-diagnosed to another;
   said attribute cardinality degree determining means determining the degree of cardinality of respective attributes of the criterion change degree patterns belonging to the event in question using a predetermined evaluation function.

17. The non-transient computer-readable storage medium according to claim 16, for further allowing said computer to operate as a diagnostic object change degree pattern generation means for calculating the degree of change of each attribute of data, including a plurality of attributes, of said object being diagnosed measured from said object being diagnosed to generate said diagnostic object change degree pattern;
   said diagnostic object change degree pattern being a combination of values of the degree of change of said attributes calculated.

18. The non-transient computer-readable storage medium according to claim 17, wherein said computer comprises an attribute cardinality degree memory that holds in store the degree of cardinality of said attributes in association with an event-to-be-diagnosed;
   said change degree pattern diagnosis means in effecting pattern matching between said criterion change degree pattern associated with said event-to-be-diagnosed and the diagnostic object change degree pattern taking into account the degree of cardinality of said attributes stored in said attribute cardinality degree memory in association with said event-to-be diagnosed of said criterion change degree pattern.

19. The non-transient computer-readable storage medium according to claim 16, wherein said change degree pattern diagnosis means effects pattern matching between said diagnostic object change degree pattern and said criterion change degree pattern stored in said criterion change degree pattern memory to make diagnosis on said object being diagnosed based on an outcome of said pattern matching.

20. The non-transient computer-readable storage medium according to claim 19, wherein said criterion change degree pattern memory holds in store the criterion change degree pattern, in accordance with a layered structure of an event-to-be-diagnosed, from one layer to another, and wherein said change degree pattern diagnosis means effects diagnosis by pattern matching using a criterion change degree pattern of an upper layer;
   said change degree pattern diagnosis means effecting pattern matching using a criterion change degree pattern of a lower layer based on an outcome of diagnosis for the upper layer.

21. The non-transient computer-readable storage medium according to claim 19, wherein said criterion change degree pattern memory holds in store a criterion change degree pattern associated with a fault-related event; and
   wherein said change degree pattern diagnosis means outputs a fault-related event associated with the criterion change degree pattern matched to said diagnostic object change degree pattern as an outcome of the diagnosis.

22. The non-transient computer-readable storage medium according to claim 21, wherein said criterion change degree pattern memory further holds in store a criterion change degree pattern associated with a normal event; and
   wherein said change degree pattern diagnosis means outputs, in connection with the diagnostic object change degree pattern not matched to any criterion change degree pattern associated with a normal event or to any criterion change degree pattern associated with said fault-related event, an outcome of the diagnosis to the effect that the diagnostic object change degree pattern is of an unknown fault.

23. The non-transient computer-readable storage medium according to claim 16, wherein said change degree pattern diagnosis means learns a set of diagnostic rules for making diagnosis of the state of said object being diagnosed from a change degree pattern, using the criterion change degree pattern stored in said criterion change degree pattern memory;
   said change degree pattern diagnosis means applying a diagnostic rule learned to said diagnostic object change degree pattern to diagnose said object being diagnosed.

24. The non-transient computer-readable storage medium according to claim 23, wherein said computer includes an attribute cardinality degree memory that holds in store the degree of cardinality of said attributes in association with an event-to-be-diagnosed;
   said change degree pattern diagnosis means in learning said diagnostic rule using the criterion change degree pattern associated with an event-to-be-diagnosed taking into account the degree of cardinality stored in said attribute cardinality degree memory in association with the event-to-be-diagnosed of said criterion change degree pattern.

25. The non-transient computer-readable storage medium according to claim 23, wherein said computer includes a layered structure memory for holding in store data of a layered structure for an event-to-be-diagnosed; said change degree pattern diagnosis means learning, for each layer stored in said layered structure memory, a diagnostic rule for diagnosing the event belonging to said layer.

26. The non-transient computer-readable storage medium according to claim 23, wherein said change degree pattern diagnosis means learns a diagnostic rule for detecting a normal state in addition to a diagnostic rule for detecting a fault; and wherein, for said diagnostic object change degree pattern that has not been diagnosed to be normal under the diagnostic rule to detect a normal state, and that has not been detected to be fault-related under the diagnostic rule to detect a fault, at the time of said diagnosis, said change degree pattern diagnosis means outputs an outcome of diagnosis to the effect that said diagnostic object change degree pattern is of an unknown fault.

* * * * *